US008184506B2

(12) United States Patent
Hirata et al.

(10) Patent No.: US 8,184,506 B2
(45) Date of Patent: May 22, 2012

(54) NEAR-FIELD OPTICAL HEAD WITH INCLINED MAGNETIC POLES AND INFORMATION RECORDING/REPRODUCING DEVICE

(75) Inventors: Masakazu Hirata, Chiba (JP); Manabu Oumi, Chiba (JP); Majung Park, Chiba (JP)

(73) Assignee: Seiko Instruments Inc. (JP)

( * ) Notice: Subject to any disclaimer, the term of this patent is extended or adjusted under 35 U.S.C. 154(b) by 137 days.

(21) Appl. No.: 12/450,320

(22) PCT Filed: Mar. 13, 2008

(86) PCT No.: PCT/JP2008/054545
§ 371 (c)(1),
(2), (4) Date: Nov. 9, 2009

(87) PCT Pub. No.: WO2008/117667
PCT Pub. Date: Oct. 2, 2008

(65) Prior Publication Data
US 2010/0091619 A1 Apr. 15, 2010

(30) Foreign Application Priority Data
Mar. 27, 2007 (JP) .................................. 2007-080430
Nov. 21, 2007 (JP) .................................. 2007-301967

(51) Int. Cl.
*G11B 11/00* (2006.01)
(52) U.S. Cl. .................................. 369/13.33; 369/13.13
(58) Field of Classification Search ............... 369/13.13, 369/13.33, 13.34
See application file for complete search history.

(56) References Cited

U.S. PATENT DOCUMENTS

| 5,197,050 | A | * | 3/1993 | Murakami et al. | 369/13.13 |
| 5,295,122 | A | * | 3/1994 | Murakami et al. | 369/13.17 |
| 5,970,038 | A | * | 10/1999 | Boutaghou et al. | 369/13.13 |
| 6,411,468 | B1 | * | 6/2002 | Park et al. | 360/236.3 |
| 6,741,524 | B2 | * | 5/2004 | Ichihara et al. | 369/13.01 |
| 2001/0017820 | A1 | * | 8/2001 | Akiyama et al. | 369/13 |
| 2003/0128452 | A1 | * | 7/2003 | McDaniel et al. | 360/59 |
| 2003/0128634 | A1 | * | 7/2003 | Challener | 369/13.33 |
| 2007/0165495 | A1 | * | 7/2007 | Lee et al. | 369/13.33 |

OTHER PUBLICATIONS

Patent Abstracts of Japan, publication No. 2004-158067, publication date Jun. 3, 2004.
Patent Abstracts of Japan, publication No. 2005-004901, publication date Jan. 6, 2005.

* cited by examiner

*Primary Examiner* — Hoa T Nguyen
*Assistant Examiner* — Mark Fischer
(74) *Attorney, Agent, or Firm* — Adams & Wilks

(57) ABSTRACT

A near-field optical head has a slider with first and second inclined surfaces that confront a magnetic recording medium during recording and reproduction of information. A recording element is formed on one of the first and second inclined surfaces and includes main and auxiliary magnetic poles stacked together with an insulation film interposed therebetween. An optical flux introducing device introduces an optical flux toward the first and second inclined surfaces of the slider, the optical flux having an optical axis inclined relative to the first and second inclined surfaces. A metal film is formed on the other of the first and second inclined surfaces of the slider for propagating the introduced optical flux along an interface between the first and second inclined surfaces to generate near-field light that is irradiated on the surface of the magnetic recording medium to effect recording and reproduction of information.

19 Claims, 12 Drawing Sheets

ROTATIONAL DIRECTION

NEAR-FIELD OPTICAL HEAD WITH INCLINED MAGNETIC POLES AND INFORMATION RECORDING/REPRODUCING DEVICE

CROSS-REFERENCE TO RELATED APPLICATION

This application is a U.S. national stage application of International Application No. PCT/JP2008/054545 filed Mar. 13, 2008, claiming an earliest priority date of Mar. 27, 2007, and published in a non-English language.

BACKGROUND OF THE INVENTION

1. Technical Field

The present invention relates to a near-field optical head which can record various kinds of information with extra high density on a magnetic recording medium by a near-field light, and an information recording/reproducing device which includes the near-field optical head.

2. Background Art

Recently, along with the increase of the capacity of a hard disk in a computer device or the like, recording density of information in a single recording surface has increased. For example, to increase the recording capacity per unit area of a magnetic disk, it is necessary to increase the surface recording density. However, along with the increase of the recording density, a recording area which 1 bit occupies on a recording medium has decreased. When the bit size becomes small, energy which information that 1 bit possesses approximates heat energy at a room temperature and hence, there arise drawbacks of thermal demagnetization such as the inversion or the dissipation of recorded information due to thermal fluctuation or the like.

As a longitudinal recording method which is used in general, there has been known a method for recording magnetism where the direction of magnetization is directed in the in-plane direction of a recording medium. In this method, however, the dissipation of the recorded information or the like is liable to occur due to the above-mentioned thermal demagnetization. To overcome such a drawback, the recording method has been replaced by a perpendicular recording method which records a magnetization signal in the direction perpendicular to a recording medium. This method is a method which records magnetism information based on a principle which allows a single magnetic pole to approach a recording medium. According to this method, a recording magnetic field is directed in the direction substantially perpendicular to a recording film. Information recorded by a vertical magnetic field can, since it is difficult for an N pole and an S pole to form a loop in a recording film surface, hold information in a stable manner in terms of energy. Accordingly, the perpendicular recording method exhibits strong resistance against thermal demagnetization in the longitudinal recording method.

However, to satisfy the needs for the recording/reproduction of larger-volume and higher-density information, in the near future, a recording medium will be in demand to satisfy the further increase of recording density. Accordingly, to minimize the influence between neighboring magnetic domains and thermal fluctuation, a recording medium which possesses a strong coercive force has started to be adopted these days. Accordingly, also in the above-mentioned perpendicular recording method, it has been difficult to record information on this recording medium.

To overcome this drawback, there has been proposed a hybrid magnetic recording method (a near-field-light assisted magnetic recording method) which temporarily lowers a coercive force by locally heating a magnetic domain with a near-field light and performs writing during a time that the coercive force is lowered. This hybrid magnetic recording method is a method which makes use of a near-field light caused by an interaction between a minute region and an optical aperture formed in a size not more than a wavelength of light formed by a near-field optical head. In this manner, by making use of the minute optical aperture which exceeds a diffraction limit of light, that is, a near-field optical head which includes a near-field light generating element, it is possible to handle optical information in a region where the size of the optical aperture becomes not more than a wavelength of light which is considered to be a limit in the conventional optical system. Accordingly, it is possible to achieve high densification of recording bits which exceeds a conventional optical information recording/reproducing device or the like.

Here, the near-field light generating element may be, besides the above-mentioned optical minute aperture, constituted of a projecting portion formed in a nanometer size, for example. With the use of such a projecting portion, it is possible to generate a near-field light in the same manner as the optical minute aperture.

As a recording head which adopts the above-mentioned hybrid magnetic recording method, there have been proposed various kinds of recording heads. As one of such recording heads, there has been known a magnetic recording head which aims at the increase of recording density by contracting a size of a light spot (for example, JP-A-2004-158067, JP-A-2005-4901).

The magnetic recording head mainly includes a main magnetic pole, an auxiliary magnetic pole, coil winding where a spiral conductive pattern is formed inside an insulator, a metal scatterer which generates a near-field light from radiated laser beams, a planar laser light source which radiates laser beams toward a metal scatterer, and a lens which condenses the radiated laser beams. These respective constitutional parts are mounted on a distal end surface of a slider which is fixed to a distal end of a beam.

The main magnetic pole has a surface which faces a recording medium on one end side thereof, and has the other end side thereof connected to the auxiliary magnetic pole. That is, the main magnetic pole and the auxiliary magnetic pole constitute a single magnetic-pole-type vertical head which arranges one magnetic pole (single magnetic pole) in the vertical direction. Further, coil winding is fixed to the auxiliary magnetic pole such that a portion of the coil winding passes between the magnetic pole and the auxiliary magnetic pole. These magnetic pole, auxiliary magnetic pole and coil winding constitute an electric magnet as a whole.

The above-mentioned metal scatterer made of gold or the like is mounted on a distal end of the main magnetic pole. Further, the above-mentioned planar laser beam source is arranged at a position spaced apart from the metal scatterer and, at the same time, the above-mentioned lens is arranged between the planar laser beam source and the metal scatterer.

The above-mentioned respective constitutional parts are mounted in the following order: the auxiliary magnetic pole, the coil winding, the main magnetic pole, the metal scatterer, the lens, the planar laser beam source from a distal-end-surface side of the slider.

When using the magnetic recording head having such a construction, a recording magnetic field is applied simultaneously with the generation of the near-field light, thus recording various kinds of information on the recording medium.

That is, laser beams are radiated from the planar laser beam source. The laser beams are converged by a lens, and are radiated to the metal scatterer. Due to such radiation of laser beams to the metal scatterer, free electrons in the metal scatterer are uniformly oscillated due to an electric field formed by the laser beams and hence, plasmons are excited whereby a near-field light is generated in the distal end portion. As a result, the magnetic recording layer of the recording medium is locally heated by the near-field light so that a coercive force is temporarily lowered.

Further, simultaneous with the above-mentioned radiation of laser beams, a drive current is supplied to the conductive pattern of the coil winding so as to locally apply a recording magnetic field to the magnetic recording layer of the recording medium near the main magnetic pole. Accordingly, it is possible to record various kinds of information on the magnetic recording layer whose coercive force is temporarily lowered. That is, recording of various kinds of information on the recording medium is performed due to the cooperative actions of the near-field light and the magnetic field.

Patent document 1: JP-A-2004-158067
Patent document 2: JP-A-2005-4901

The above-mentioned conventional near-field optical head, however, still has following drawbacks.

That is, in generating the near-field light inevitable for recording information, the laser beams are converged and radiated to the metal scatterer from the planar laser beam source by way of the lens. However, since the metal scatterer is mounted on the distal end of the main magnetic pole, laser beams must be radiated with an optical axis of laser beams from the planar laser beam source arranged in oblique posture. Accordingly, even when the positional adjustment of the lens position is carried out favorably, it is difficult to efficiently condense laser beams on the metal scatterer. Particularly, since it is necessary to arrange the lens while taking the interference with the recording medium into consideration, a semicircular lens is used. The use of such a lens also causes lowering of condensing efficiency.

As a result, the near-field light cannot be generated efficiently and hence, there may be a case where writing of information is not possible.

Further, it is necessary to arrange the lens at a position spaced-apart from the metal scatterer and hence, a size of the head becomes large whereby the head cannot have the compact constitution. Still further, it is necessary to arrange the planar laser beam source while taking the position of the lens and the position of the metal scatterer into consideration and hence, the head cannot be easily installed.

SUMMARY OF THE INVENTION

The present invention has been made to overcome the foregoing drawbacks in the conventional art, and it is an object of the present invention to provide a near-field optical head which can efficiently generate a near-field light while achieving the miniaturization thereof and which can enhance reliability in writing information, and to provide an information recording/reproducing device having the near-field optical head.

The present invention provides following means for overcoming the above-mentioned drawbacks.

The near-field optical head according to the present invention is a near-field optical head which generates a near-field light from an introduced optical flux thus heating a magnetic recording medium which is rotated in a fixed direction and also applies a recording magnetic field in a direction perpendicular to the magnetic recording medium so as to generate the inversion of magnetization thus recording information on the magnetic recording medium, wherein the near-field optical head includes: a slider which is arranged in a state where the slider faces a surface of the magnetic recording medium in an opposed manner and has an opposedly-facing surface which faces the surface of the magnetic recording medium; an optical flux introducing means which introduces the optical flux into the inside of the slider toward the opposedly-facing surface; a first inclined surface and a second inclined surface which are formed on the slider such that the first inclined surface and the second inclined surface project toward the magnetic recording medium from the opposedly-facing surface in an inclined manner with respect to an optical axis of the introduced optical flux, the first inclined surface and the second inclined surface being arranged adjacent to each other so as to share one side in common; a recording element which is formed on one inclined surface out of the first inclined surface and the second inclined surface and includes a main magnetic pole and an auxiliary magnetic pole which are stacked on each other with an insulation film sandwiched therebetween; a metal film which is formed on the other inclined surface out of the first inclined surface and the second inclined surface and allows the introduced optical flux to propagate along an interface between the metal film and the other inclined surface and, thereafter, generates the near-field light which extends toward a surface of the magnetic recording medium from the optical flux; and a magnetic field generating means which generates the recording magnetic field between the main magnetic pole and the auxiliary magnetic pole.

In the near-field optical head according to this invention, it is possible to perform recording of information on the rotating magnetic recording medium by a hybrid magnetic recording method in which a near-field light generated by the metal film and a recording magnetic field generated between the main magnetic pole and the auxiliary magnetic pole are cooperatively used.

The slider is arranged to face the magnetic recording medium in an opposed manner in a state that the opposedly-facing surface is directed toward a surface of the magnetic recording medium. The first inclined surface and the second inclined surface which share one side in common are formed on the slider in a state where these inclined surfaces are arranged adjacent to each other. Both these inclined surfaces are formed in a projecting manner toward the magnetic recording medium in a state that both inclined surfaces are inclined with respect to an optical axis of the optical flux introduced by the optical flux introducing means. Further, out of both inclined surfaces, the recording element for generating the recording magnetic field is formed on one inclined surface, and the metal film for generating the near field light is formed on the other inclined surface. Here, the recording element is constituted of the main magnetic pole and the auxiliary magnetic pole which are stacked on each other with the insulation film sandwiched therebetween. The main magnetic pole may be positioned on one inclined surface side or the auxiliary magnetic pole may be positioned on one inclined surface.

In performing the recording in the present invention, the optical flux is introduced into the inside of the slider by the optical flux introducing means. Here, the optical flux is introduced such that an optical axis becomes linear toward the opposedly facing surface of the slider. As a result, the introduced optical flux is incident on the first inclined surface and the second inclined surface which are inclined obliquely with respect to the optical axis. Here, out of both inclined surfaces, the metal film is formed on the other inclined surface and hence, the optical flux is incident on the metal film. When the optical flux is incident on the metal film, surface plasmons are excited on the metal film. The excited surface plasmons are reinforced due to a resonance effect, and propagate toward a magnetic recording medium side along an interface between a surface of the metal film and the other inclined surface. Then, at a point of time that the surface plasmons arrive at an end portion of the other inclined surface, the surface plasmons become the near-field light and the near-field light leaks to the outside.

In this manner, the metal film generates the near-field light from the introduced optical flux and, at the same, can generate the near-field light in a state that the near-field light is localized between the metal film and the other inclined surface. The magnetic field recording medium is locally heated by the near-field light so that a coercive force of the magnetic recording medium is lowered temporarily. Particularly, both inclined surfaces are arranged adjacent to each other in a state where both inclined surfaces share one side in common and hence, the localized near field light is generated in the vicinity of one inclined surface. Accordingly, it is possible to lower the coercive force of the magnetic recording medium at a position as close as possible to one inclined surface.

On the other hand, simultaneous with the above-mentioned introduction of the optical flux, the recording magnetic field is generated between the main magnetic pole and the auxiliary magnetic pole by operating the magnetic field generating means. Here, the recording element is formed on one inclined surface and hence, it is possible to generate the recording magnetic field at a position which is as close as possible to a point where the localized near-field light is generated. Accordingly, it is possible to generate the recording magnetic field at a pin point with respect to the localized position of the magnetic recording medium where the coercive force is lowered by the near-field light. The recording magnetic field has the direction thereof changed corresponding to information to be recorded. When the magnetic recording medium receives the recording magnetic field, the direction of magnetization is changed in the vertical direction corresponding to the direction of the recording magnetic field. As a result, recording of the information can be performed.

That is, it is possible to perform recording of information by the hybrid magnetic recording method in which the near-field light and the recording magnetic field are cooperatively used. Further, since the vertical magnetic recording method is adopted, the optical head hardly receives a phenomenon such as thermal fluctuation and hence, it is possible to perform stable recording with high writing reliability.

Particularly, the optical flux can be introduced linearly toward the first inclined surface and the second inclined surface by making use of the optical flux introducing means and, at the same time, it is unnecessary to propagate the optical flux in air different from the prior art and hence, it is possible to efficiently generate the near-field light while suppressing the light introduction loss as much as possible. Further, the metal film and the recording element are formed on the first inclined surface and the second inclined surface which are arranged adjacent to each other and hence, a point where the near-field light is generated and a point where the recording magnetic field is generated can be made as close as possible to each other. That is, it is possible to generate the recording magnetic field at a peak position of a heating temperature due to the near-field light. Accordingly, recording can be surely performed and, at the same time, high-density recording can be realized.

Further, by merely forming the metal film and the recording element on the first inclined surface and the second inclined surface formed on the slider, the generation of the near-field light and the generation of the recording magnetic field can be realized simultaneously and hence, the optical head can have the simple structure without adopting the complicated structure of the related art. Accordingly, the constitution of the optical head can be simplified thus realizing the miniaturization of the optical head.

Further, the near-field optical head according to the present invention is, in the above-mentioned near-field optical head according to the present invention, characterized in that the near-field optical head of the present invention further comprises a plurality of convex-shaped pressure generating portions which is formed on the oppositely-facing surfaces and generates pressure for floating the slider by making use of an air flow generated by the rotating magnetic recording medium, and the pressure generating portions are formed so as to have a height approximately equal to a height of the first inclined surface and the second inclined surface.

In the near-field optical head according to this invention, a plurality of pressure generating portions is formed on the oppositely-facing surface of the slider and hence, it is possible to perform recording in an air floating method in which slider is floated from a surface of the magnetic recording medium. Further, the pressure generating portions have approximately the same height as the height of the first inclined surface and the second inclined surface and hence, it is possible to float the slider in a stable manner while preventing both inclined surfaces from coming into contact with the recording medium thus ensuring stable recording.

Further, the near-field optical head according to the present invention is further characterized in that the first inclined surface also functions as at least a portion of a distal end surface of the slider, and the recording element is formed on the first inclined surface.

In the near-field optical head according to this invention, the first inclined surface is formed such that the first inclined surface also functions as at least a portion of a distal end surface of the slider, and the recording element is formed on the first inclined surface and hence, it is possible to generate the near field light and the recording magnetic field at a position as close as possible to a distal end side of the slider. Here, when the slider is floated by air, there may be a case where the slider is inclined with a distal end side thereof approaching the magnetic recording medium. Even in such a case, it is possible to generate the near-field light and the recording magnetic field on the distal end side of the slider closest to the magnetic recording medium and hence, stable recording can be realized thus enhancing reliability of the optical head.

The near-field optical head according to the present invention is, in the above-mentioned near-field optical head according to the present invention, characterized in that the near-field optical head further comprises a polyhedron which is formed on the slider such that the polyhedron projects toward a surface of the magnetic recording medium from the oppositely-f acing surface and has four side surfaces which are inclined with respect to an optical axis of the introduced optical flux, and a plurality of convex-shaped pressure generating portions which is formed on the oppositely-facing surfaces and generate pressure for floating the slider by making use of an air flow generated by the rotating magnetic recording medium, and one surface out of said four side surfaces of the polyhedron also functions as at least a portion of a distal end surface of the slider, and two neighboring surfaces out of said four side surfaces of the polyhedron constitute the first inclined surface and the second inclined surface respectively, and the pressure generating portions have approximately the same height as the height of the polyhedron.

In the near-field optical head according to this invention, the plurality of pressure generating portions is formed on the opposedly facing surface of the slider and hence, it is possible to perform recording by an air floating method which floats the slider from the surface of the magnetic recording medium. Further, the pressure generating portions have approximately the same height as the height of the polyhedron and hence, it is possible to float the slider in a stable manner while preventing the polyhedron from coming into contact with the magnetic recording medium thus ensuring stable recording.

Further, the first inclined surface and the second inclined surface can be formed at a time by merely forming the polyhedron on the opposedly facing surface and hence, both inclined surfaces can be aligned with each other with high accuracy. Accordingly, positioning can be performed by arranging a point where the near-field light is generated and a point where the recording magnetic field is generated as close as possible to each other. Accordingly, recording can be performed more reliably. Further, out of four side surfaces, one surface is formed so as to function also as at least a portion of the distal end surface of the slider and hence, it is possible to generate the near-field light and the recording magnetic field at a position as close as possible to a distal end side of the slider. Here, when the slider is floated by air, there may be a case where the slider is inclined with a distal end side thereof approaching the magnetic recording medium. Even in such a case, it is possible to generate the near-field light and the recording magnetic field on the distal end side of the slider closest to the magnetic recording medium and hence, stable recording can be realized thus enhancing reliability of the optical head.

Further, the near-field optical head according to the present invention is, in the above-mentioned near-field optical head according to the present invention, characterized in that one surface which also functions as at least the portion of the distal end surface of the slider constitute the first inclined surface, and the recording element is formed on the first inclined surface.

In the near-field optical head according to this invention, it is possible to generate the recording magnetic field at a position further closer to a distal end side of the slider. Accordingly, even when the slider is inclined at the time of floating the slider by air, it is possible to perform recording in a more stable manner.

Further, the near-field optical head according to the present invention is, in the above-mentioned near-field optical head according to the present invention, characterized in that the metal film is formed on at least either one of two remaining surfaces other than the side surfaces which constitute the first inclined surface and the second inclined surface out of four side surfaces of the polyhedron.

In the near-field optical head according to this invention, a metal film is formed on at least one surface of remaining two surfaces of the polyhedron and hence, it is possible to generate the near-field light more effectively. Accordingly, the magnetic recording medium can be heated more efficiently thus easing recording of information.

Further, the near-field optical head according to the present invention is, in any one of the above-mentioned near-field optical heads of the present invention, characterized in that the polyhedron is formed in a pyramidal shape, and the polyhedron has an end surface which is parallel to a surface of the magnetic recording medium.

In the near-field optical head according to this invention, the peak portion of the polyhedron forms an end surface and hence, the near-field light which propagates along the interface between the metal film and the other inclined surface is liable to leak to the outside. Accordingly, it is possible to generate the near-field light having higher intensity and hence, a magnetic recording medium can be heated more efficiently thus facilitating the recording of information.

Further, the near-field optical head according to the present invention is, in any one of the above-mentioned near-field optical heads of the present invention, characterized in that the polyhedron also functions as one of said pressure generating portions.

In the near-field optical head according to this invention, the polyhedron also functions as one'pressure generating portion and hence, the constitution of the optical head can be simplified more thus enabling simple designing. Further, it is possible to eliminate a factor which obstructs the air flow besides the pressure generating portions from the opposedly-facing surface and hence, it is possible to control a floating quantity of the slider by merely designing the pressure generating portions. Accordingly, a floating quantity of the slider can be adjusted as designed.

Further, the near-field optical head according to the present invention is, in any one of the above-mentioned near-field optical heads of the present invention, characterized in that the near-field optical head further includes a negative pressure generating portion which is formed on the opposedly-facing surfaces and generates negative pressure for sucking the slider toward a magnetic recording medium side by making use of an air flow generated by the rotating magnetic recording medium.

In the near-field optical head according to this invention, it is possible to suck the slider which is floated by air toward the magnetic recording medium side by a negative pressure generated by the negative pressure generating portion. Accordingly, it is possible to float the slider by air in a more stable state by suppressing floating irregularities by making use of the positive pressure for floating the slider and the negative pressure for sucking the slider. Accordingly, it is possible to accurately apply the near-field light and the recording magnetic field to a targeted position of the magnetic recording medium thus enhancing the reliability of the optical head.

Further, the near-field optical head according to the present invention is, in any one of the above-mentioned near-field optical heads of the present invention, characterized in that the near-field optical head includes a reproducing element which outputs an electric signal corresponding to a magnitude of a magnetic field leaked from the magnetic recording medium.

In the near-field optical head according to this invention, the reproducing element outputs an electric signal corresponding to the magnitude of the magnetic field leaked from the magnetic recording medium. Accordingly, it is possible to reproduce information recorded in the magnetic recording medium based on the electric signal outputted from the reproducing element.

Further, an information recording/reproducing device according to the present invention is characterized by including: the near-field optical head described in anyone of the above-mentioned present inventions; a beam which is movable in the direction parallel to a surface of the magnetic recording medium and supports the near-field optical head on a distal end side thereof in a state where the near-field optical head is rotatable about two axes which are parallel to a surface of the magnetic recording medium and are orthogonal to each other; a light source which allows the optical flux to be incident on the optical flux introducing means; an actuator which supports a proximal end side of the beam and moves the beam along the direction parallel to the surface of the magnetic recording medium; a rotation driving part which rotates the magnetic recording medium in the fixed direction; and a control part which controls an operation of the magnetic field generating means and an operation of the light source.

In the information recording/reproducing device according to this invention, the magnetic recording medium is rotated in the fixed direction by the rotation driving part and, thereafter, the beam is moved by the actuator to allow the near-field optical head to perform scanning. Then, the near-field optical head is arranged at a desired position above the magnetic recording medium. Here, the near-field optical head is supported on the beam in a state that the near-field optical head is rotatable about two axes which are arranged parallel to the surface of the magnetic recording medium and are orthogonal to each other, that is, in a state that the near-field optical head can be twisted about two axes. Accordingly, even when waviness is generated on the magnetic recording medium, a change of wind pressure attributed to waviness or a change of waviness which is directly transmitted can be absorbed by twisting thus allowing the near-field optical head to have the stable posture.

Thereafter, the control part operates the magnetic field generating portion and the light source. Due to such an operation, the near-field optical head can record information on the magnetic recording medium using the near-field light and recording magnetic field cooperatively. Particularly, due to the provision of the above-mentioned near-field optical head, the reliability of writing can be enhanced so that the optical head can cope with high-density recording whereby the optical head can acquire high quality. Further, the information recording/reproducing device can be miniaturized simultaneously.

DETAILED DESCRIPTION OF THE PREFERRED EMBODIMENTS (First Embodiment)

Hereinafter, a first embodiment of a near-field optical head and an information recording/reproducing device according to the present invention is explained in conjunction with FIG. 1 to FIG. 7. The information recording/reproducing device 1 of this embodiment is a device which performs writing by a perpendicular recording method with respect to a disk (magnetic recording medium) D having a perpendicular recording layer d2. This embodiment is explained by taking an air-floating-type information recording/reproducing device in which a near-field optical head 2 is floated by making use of an air flow caused by rotation of the disk D as an example.

Figure 1:
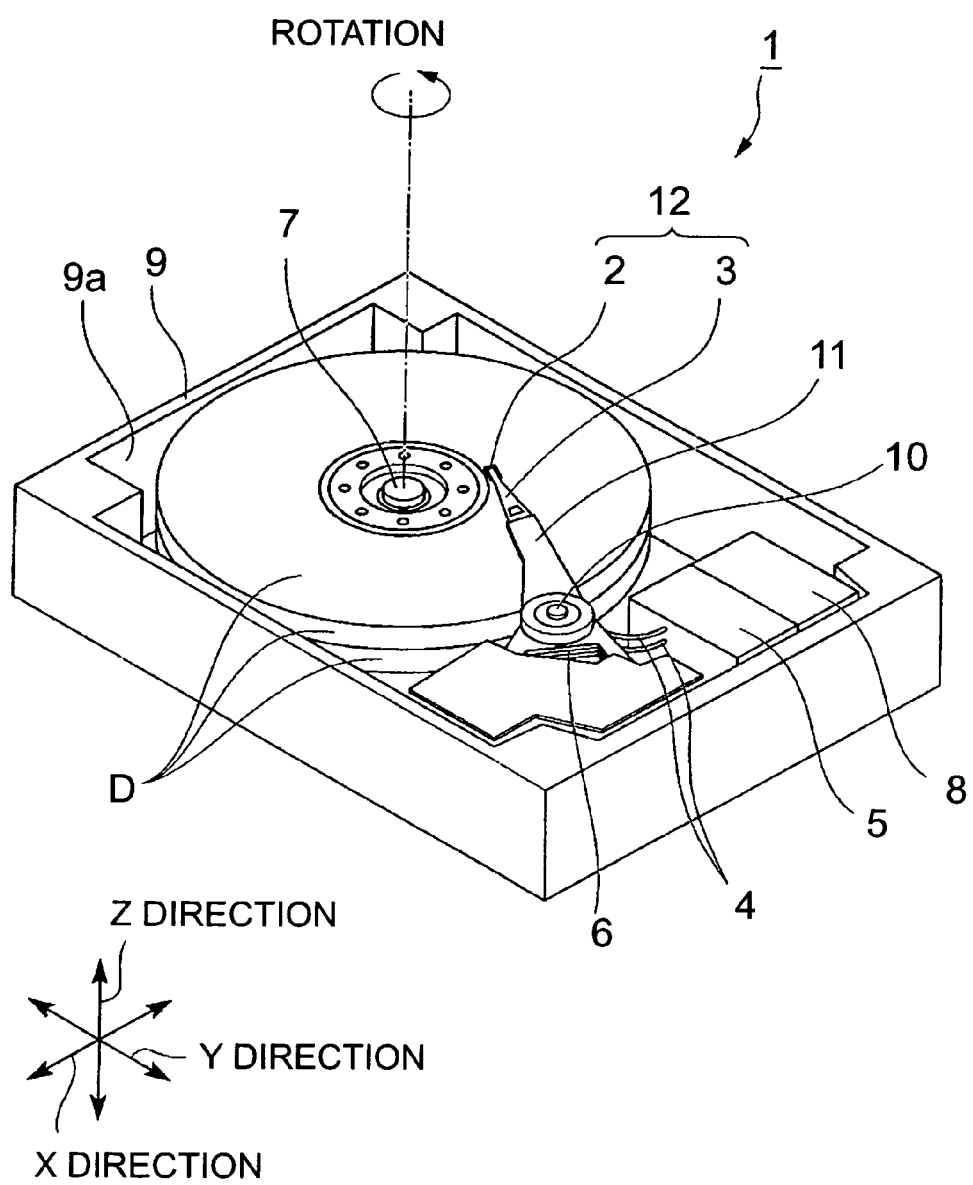
FIG. 1 is a constitutional view showing a first embodiment of an information recording/reproducing device having a near-field optical head according to the present invention.

The information recording/reproducing device 1 of this embodiment includes, as shown in FIG. 1, the near-field optical head 2, a beam 3 which is movable in the XY direction parallel to a disk surface (surface of the magnetic recording medium) D1 and supports the near-field optical head 2 on a distal end side thereof in a state where the near-field optical head 2 is rotatable about two axes (X axis, Y axis) which are parallel to the disk surface D1 and are orthogonal to each other, an optical signal controller (light source) 5 which allows an optical flux L to be incident on an optical waveguide 4 from a proximal end side of the optical waveguide 4, an actuator 6 which supports a proximal end side of the beam 3 and allows the beam 3 to perform the scanning movement along the XY direction parallel to the disk surface D1, a spindle motor (rotation driving part) 7 which rotates the disk D in the fixed direction, a control part 8 which controls an operation of a magnetic field generating means 28 and an operation of the optical signal controller 5 described later, and a housing 9 which houses these respective constitutional parts in the inside thereof.

The housing 9 is made of a metal material such as aluminum, has a quadrangular shape as viewed in a plan view, and forms a recessed portion 9a therein for housing the respective constitutional parts. Further, the housing 9 is provided with a lid, not shown in the drawing, which is detachably fixed to the housing 9 for closing an opening of the recessed portion 9a. The above-mentioned spindle motor 7 is mounted on an approximately center portion of the recessed portion 9a. By allowing the spindle motor 7 to be fitted in a center hole of the disk D, the disk D is detachably fixed. The above-mentioned actuator 6 is mounted on a corner portion of the recessed portion 9a. A carriage 11 is mounted on the actuator 6 by way of a bearing 10, and the beam 3 is mounted on a distal end of the carriage 11. Both the carriage 11 and the beam 3 are movable together in the above-mentioned XY direction when the actuator 6 is driven.

The carriage 11 and the beam 3 are configured to retract from a position above the disk D due to driving of the actuator 6 when the rotation of the disk D is stopped. Further, the near-field optical head 2 and the beam 3 constitute a suspension 12. Further, the optical signal controller 5 is mounted in the inside of the recessed portion 9a adjacent to the actuator 6. The above-mentioned control part 8 is mounted adjacent to the actuator 6.

The above-mentioned near-field optical head 2 is provided for generating a near-field light R from an introduced optical flux L thus heating the rotating disk D and also applies a recording magnetic field in a direction perpendicular to the disk D so as to generate the inversion of magnetization thus recording information on the disk D.

Figure 2:
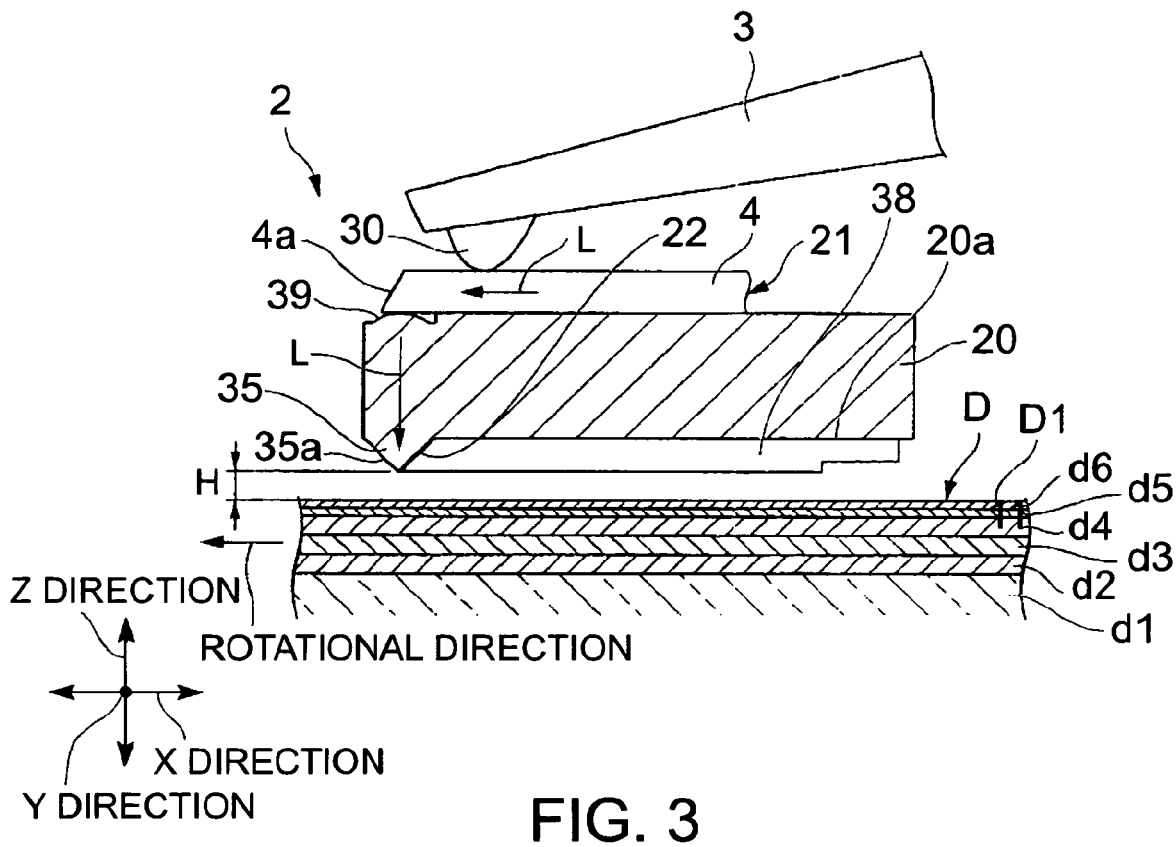
FIG. 2 is an enlarged cross-sectional view of the near-field optical head shown in FIG. 1.
Figure 3:
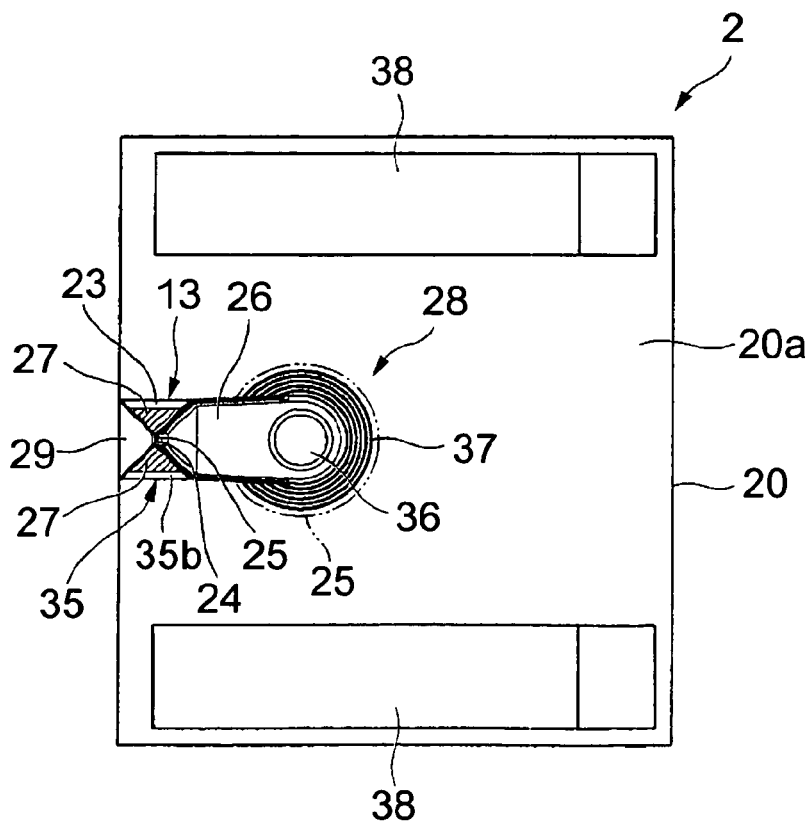
FIG. 3 is a view of the near-field optical head shown in FIG. 2 as viewed from a disk surface side.
Figure 4:
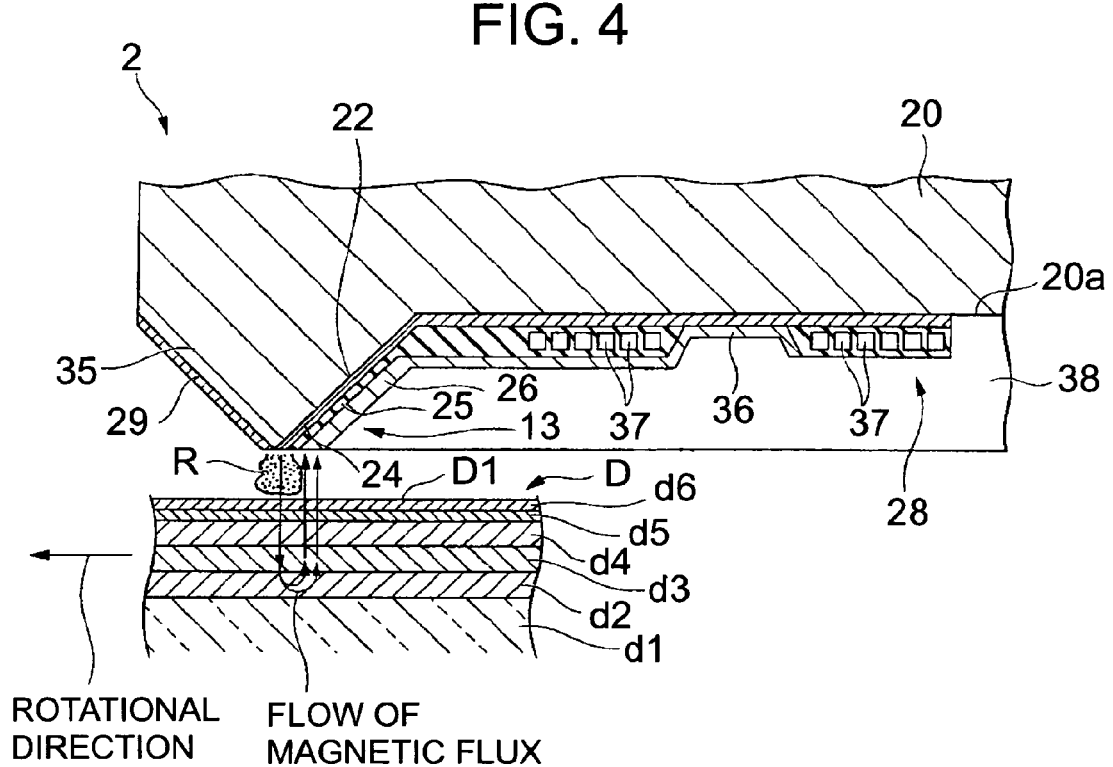
FIG. 4 is an enlarged cross-sectional view of a main magnetic pole and parts arranged around the main magnetic pole showing a state where information is being recorded on a disk by the near-field optical head shown in FIG. 2.

As shown in FIG. 2 to FIG. 4, the near-field optical head 2 is arranged in a state where the near-field optical head 2 is floated from the disk surface D1 by a predetermined distance H. The near-field optical head 2 includes a slider 20 which has an opposedly-facing surface 20a which faces the disk surface D1 in an opposed manner; an optical flux introducing means 21 which introduces the optical flux L from the optical signal controller 5 to the inside of the slider 20 toward the opposedly-facing surface 20a; a first inclined surface 22 and a second inclined surface 23 which are formed on the slider 20; a recording element 13 which is formed on one inclined surface (first inclined surface 22) out of both inclined surfaces 22, 23; a metal film 27 which is formed on the other inclined surface (second inclined surface 23) out of both inclined surfaces 22, 23; a magnetic field generating means 28 which generates a recording magnetic field between a main magnetic pole 24 and an auxiliary magnetic pole 26 which constitute the recording element 13; and a reproducing element 29 which outputs an electric signal corresponding to a magnitude of a magnetic field leaked from the disk D.

The above-mentioned recording element 13 is constituted of the main magnetic pole 24 and the auxiliary magnetic pole 26 which are stacked on each other with an insulation film 25 sandwiched therebetween. In this embodiment, the explanation is made by taking the recording element 13 which is formed by stacking the main magnetic pole 24, the insulation film 25 and the auxiliary magnetic pole 26 in order from one inclined surface side as an example. The recording element 13 may be also formed by stacking the auxiliary magnetic pole 26, the insulation film 25 and the main magnetic pole 24 in order from one inclined surface side. Further, in FIG. 2, to facilitate the understanding of the drawing, the illustration of the metal film 27, the main magnetic pole 24 and the like is omitted.

As shown in FIG. 2, the above-mentioned slider 20 is made of a light transmitting material such as quartz glass and has an approximately rectangular parallelepiped shape. The slider 20 is supported in a suspending manner on a distal end of the beam 3 by way of a gimbal portion 30 in a state that the opposedly facing surface 20a is arranged on a disk D side. The gimbal portion 30 is a part whose movement is restricted such that the gimbal portion 30 is displaced only about an X axis and about a Y axis. Due to such a constitution, the slider 20 is configured to be rotatable about two axes (X axis, Y axis) which are parallel to the disk surface D1 and orthogonal to each other as described above.

Figure 5:
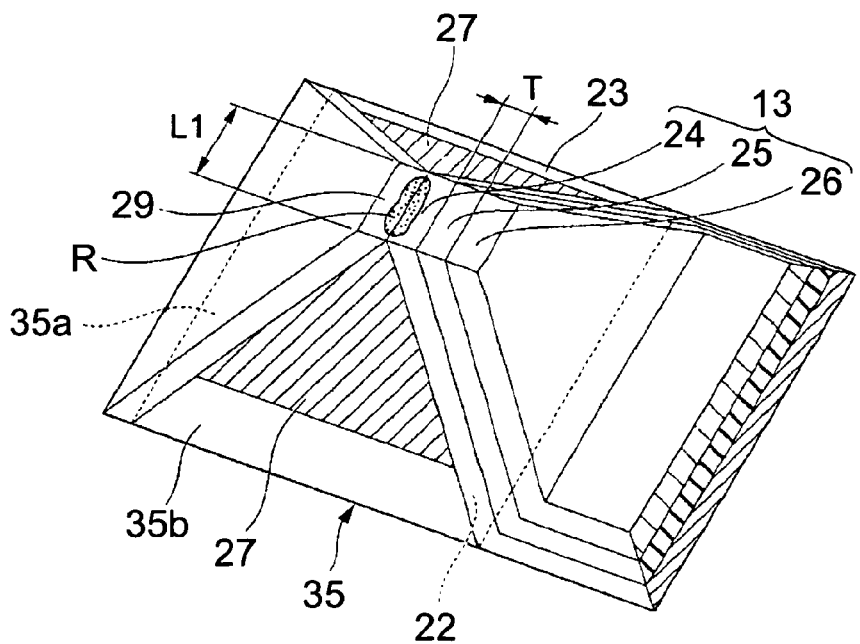
FIG. 5 is an enlarged perspective view of a polyhedron whose two side surfaces are used as a first inclined surface and a second inclined surface and parts around the polyhedron in the near-field optical head shown in FIG. 2.

As shown in FIG. 2 to FIG. 5, on the slider 20 of this embodiment, a polyhedron 35 is formed in a state that the polyhedron 35 projects toward the disk D from the opposedly facing surface 20a. The polyhedron 35 has four side surfaces which are inclined with respect to an optical axis of the introduced optical flux L. The polyhedron 35 is formed on a distal end side of the slider 20, and one surface 35a out of four side surfaces functions also as a portion of a distal end surface of the slider 20 (hereinafter, expressed as an end surface on an outflow end side). Further, out of three remaining side surfaces of the polyhedron 35, two neighboring surfaces constitute the above-mentioned first inclined surface 22 and second inclined surface 23. To be more specific, the surface which opposedly faces the side surface 35a functioning also as a portion of the end surface on the outflow end side constitutes the first inclined surface 22, and the side surface arranged adjacent to the first inclined surface 22 constitutes the second inclined surface 23. That is, the first inclined surface 22 and the second inclined surface 23 are arranged adjacent to each other to share one side in common. Further, as shown in FIG. 5, the polyhedron 35 of this embodiment is formed such that a side of the side surface 35a and a side of the first inclined surface 22 overlap with each other at a peak portion.

As shown in FIG. 4, the main magnetic pole 24 is formed on an area ranging from the first inclined surface 22 to the opposedly facing surface 20a by vapor deposition or the like. The main magnetic pole 24 is made of a material of high saturated magnetic flux density (Bs) having high magnetic flux density such as CoNiFe alloy or CoFe alloy, for example. The auxiliary magnetic pole 26 is stacked on the main magnetic pole 24 with the insulation film 25 sandwiched therebetween. The auxiliary magnetic pole 26 is formed using the same material as the main magnetic pole 24.

Further, the main magnetic pole 24 and the auxiliary magnetic pole 26 are connected with each other by a magnetic circuit 36. Further, around the magnetic circuit 36, a coil 37 which is wound spirally around the magnetic circuit 36 is formed on the insulation film 25 in a molded state. Accordingly, the coil 37 is arranged with gaps such that short circuiting between neighboring coil lines, short circuiting between the coil 37 and the magnetic circuit 36 and short circuiting between both magnetic poles 24, 26 can be prevented. The coil 37 is electrically connected to the control part 8 by way of the beam 3 and the carriage 11, and an electric current which is modulated corresponding to information from the control part 8 is supplied to the coil 37. That is, the magnetic circuit 36 and the coil 37 constitute an electromagnet as a whole, and function as the above-mentioned magnetic field generating means 28.

The above-mentioned metal film 27 is an Au film, for example, and is formed on the second inclined surface 23 by vapor deposition or the like. The metal film 27 propagates the optical flux L introduced by the optical flux introducing means 21 along an interface between the metal film 27 and the second inclined surface 23 and, thereafter, generates a near-field light R which is directed toward the disk surface D1. This phenomenon is explained in detail later.

In this embodiment, the metal film 27 is formed not only on the second inclined surface 23 but also on a side surface 35b which faces the second inclined surface 23 in an opposed manner.

Further, on a side surface 35a of the polyhedron 35 which also functions as a portion of the end surface of the slider 20 on the outflow end side, the above-mentioned reproducing element 29 is formed. The reproducing element 29 is an element which is constituted of a magnetic resistance effect film or the like whose electric resistance is changed corresponding to a magnitude of a magnetic field leaked from the perpendicular recording layer b2 of the disk D. A bias current is supplied to the reproducing element 29 from the control part 8 via a lead film or the like not shown in the drawing. Then, the reproducing element 29 detects a change of the magnetic field leaked from the disk D as a change of voltage and, thereafter, outputs the change of voltage to the control part 8 as an electric signal. Accordingly, the control part 8 can reproduce information recorded in the disk D based on the electric signal.

As shown in FIG. 3, on the oppositely-facing surface 20a of the slider 20, a plurality of positive pressure pad (pressure generating portions) 38 is formed for generating pressure for floating the slider 20 by making use of an air flow generated by the rotating disk D. In this embodiment, a case in which two positive pressure pads 38 extending in the longitudinal direction are formed as rails arranged parallel to each other is described as an example. However, this embodiment is not limited to such a case. That is, provided that the positive pressure pads 38 are designed such that the slider 20 is floated in an optimum state by adjusting a positive pressure which is used for separating the slider 20 from the disk surface D1 and a negative pressure which is used for sucking the slider 20 to the disk surface D1, the positive pressure pads 38 may be formed in any concave-convex shape. A surface of the positive pressure pad 38 forms a surface referred to as ABS (Air Bearing Surface).

Further, as shown in FIG. 2, the positive pressure pad 38 is configured to have approximately the same height as the height of the polyhedron 35. That is, a peak portion of the polyhedron 35 is made coplanar with the ABS. The slider 20 receives a force which floats the slider 20 from the disk surface D1 by these two positive pressure pads 38. Further, the beam 3 is designed to deflect in the Z direction perpendicular to the disk surface D1 so as to absorb the floating force of the slider 20. That is, the slider 20 receives a force which pushes the slider 20 toward a disk surface D1 side by the beam 3 when the slider 20 is floated. Accordingly, due to a balance between two forces, the slider 20 is floated in a spaced-apart manner from the disk surface D1 by a predetermined distance H as described above. Further, the slider 20 is configured to be rotated about the X axis and about the Y axis due to the gimbal portion 30 and hence, the slider 20 flows while always holding posture thereof in a stable state.

An air flow which is generated along with the rotation of the disk D flows into from an inflow end side of the slider 20 (a proximal end side of the beam 3) and, thereafter, flows along the ABS. Then, the air flow flows out from an outflow end of the slider 20 (a distal end side of the beam 3).

Further, a lens 39 is formed on an upper surface of the slider 20 at a position right above the polyhedron 35. The lens 39 is an aspherical micro lens formed by etching using a grayscale mask, for example. Further, the optical waveguide 4 formed of an optical fiber or the like is mounted on an upper surface of the slider 20. The optical waveguide 4 has a mirror surface 4a which is cut by approximately 45 degrees at a distal end thereof, and the mounting position of the optical waveguide 4 is adjusted such that the mirror surface 4a is positioned right above the lens 39. Then, the optical waveguide 4 is led and connected to the optical signal controller 5 by way of the beam 3, the carriage 11 and the like.

Due to such a constitution, the optical waveguide 4 can guide the optical flux L incident from the optical signal controller 5 to a distal end side thereof, changes the direction of the optical flux L by reflection on the mirror surface 4a and, thereafter, can radiate the optical flux L to the lens 39. Further, the radiated optical flux L advances in the inside of the slider 20 while being converged by the lens 39, and is introduced into the polyhedron 35. That is, the optical waveguide 4 and the lens 39 function as the above-mentioned optical flux introducing means 21.

The disk D of this embodiment uses a vertical two-layered film disk which is constituted of two layers, that is, a perpendicular recording layer d4 having a magnetization easing axis in the direction perpendicular to at least the disk surface D1 and a soft magnetic layer d2 made of a high magnetic-permeability material. As such a disk D, for example, as shown in FIG. 2, a film formed by stacking the soft magnetic layer d2, an intermediate layer d3, the perpendicular recording layer d4, a protective layer d5 and a lubrication layer d6 on a substrate d1 in this order is used.

The substrate d1 is formed of an aluminum substrate, a glass substrate or the like, for example. The soft magnetic layer d2 is formed of a high coercive layer. The intermediate layer d3 is a crystal control layer of the perpendicular recording layer d4. The perpendicular recording layer d4 is formed of a vertical anisotropic magnetic layer, and is made of CoCrPt-based alloy, for example. The protective layer d5 is provided for protecting the perpendicular recording layer d4, and is formed of a DLC (diamond-like-carbon) film, for example. The lubrication layer d6 is formed using a fluoric liquid lubrication material, for example.

Next, a case where various kinds of information is recorded on and reproduced from the disk D by the information recording/reproducing device 1 having the above-mentioned constitution is explained.

First of all, the disk D is rotated in the fixed direction by driving the spindle motor 7 toward the fixed direction. Next, the actuator 6 is operated so as to allow the beam 3 to perform scanning in the XY directions by way of the carriage 11. Due to such an operation, as shown in FIG. 1, it is possible to position a near-field optical head 2 at a desired position over the disk D. Here, the near-field optical head 2 receives a force which floats the slider 20 using two positive pressure pads 38 formed on the oppositely-facing surface 20a of the slider 20 and, at the same time, the near-field optical head 2 is pressed toward the disk D side by the beam 3 or the like with a predetermined force. The near field optical head 22 is floated at a position spaced apart from the disk D by a predetermined distance H as shown in FIG. 2 due to a balance between these forces.

Further, even when the near-field optical head 2 receives wind pressure generated due to waviness of the disk D, the displacement of the disk D in the Z direction is absorbed by the beam 3, and the near-field optical head 2 can be displaced about the XY axes due to the gimbal portion 30 and hence, wind pressure due to waviness can be absorbed. Accordingly, it is possible to float the near-field optical head 2 in a stable state.

Here, in recording information, the control part 8 operates the optical signal controller 5, and supplies an electric current modulated corresponding to information to the coil 37.

The optical signal controller 5 receives an instruction from the control part 8, and allows the optical flux L to be incident on the optical waveguide 4 from a proximal end side of the optical waveguide 4. The incident optical flux L advances in the inside of the optical waveguide 4 toward a distal end side of the optical waveguide 4. Then, as shown in FIG. 2, the direction of the optical flux L is changed approximately 90 degrees by the mirror surface 4a, and the optical flux L is radiated from the inside of the optical waveguide 4. The radiated optical flux L advances in the inside of the slider 20 in a state that the optical flux L is converged by the lens 39, and is incident on the polyhedron 35 provided approximately right below the lens 39. That is, the optical flux L is introduced into the slider 20 by the optical flux introducing means 21 such that the optical flux L straightly advances toward the opposely facing surface 20a from an upper surface side of the slider 20.

The optical flux L introduced in the polyhedron 35 is incident on 4 side surfaces (side surface 35a, side surface 35b, first inclined surface 21, second inclined surface 22) obliquely inclined with respect to the optical axis. Here, the metal film 27 is formed on the side surface 35b and the second inclined surface 23 and hence, the optical flux L is incident on these metal films 27.

When the optical flux L is incident on the metal film 27, surface plasmons are excited on the metal film 27. The excited surface plasmons are reinforced due to a resonance effect, and propagate toward the disk D along an interface between a surface of the metal film 27 and the second inclined surface 23 and an interface between the surface of the metal film 27 and the side surface 35b. Then, at a point of time that the surface plasmons arrive at a peak portion of the polyhedron 35, as shown in FIG. 4 and FIG. 5, the surface plasmons become the near-field light R and the near-field light R leaks to the outside.

In this manner, the metal film 27 generates the near-field light R from the introduced optical flux L and, at the same, can generate the near-field light R in a state that the near-field light R is localized between the metal film 27 and the second inclined surface 23 and between the metal film 27 and the side surface 35b. Particularly, in this embodiment, the metal films 27 face each other in an opposed manner and hence, as shown in FIG. 5, there arise a state where the near-field light R is localized between peaks of two metal films 27. Then, the disk D is locally heated by the near-field light R so that a coercive force of the disk D is lowered temporarily. Particularly, the first inclined surface 22 and the second inclined surface 23 are arranged adjacent to each other in a state where both inclined surfaces share one side in common and hence, the localized near-field light R is generated in the vicinity of the first inclined surface 22. Accordingly, it is possible to lower the coercive force of the disk D at a position as close as the first inclined surface 22.

On the other hand, when an electric current is supplied to the coil 37 by the control part 8, a current magnetic field generates a magnetic flux in the inside of the magnetic circuit 36 due to the principle of electromagnet and hence, it is possible to generate a recording magnetic field in the direction perpendicular to the disk D between the main magnetic pole 24 and the auxiliary magnetic pole 26. Then, the magnetic flux generated from a main-magnetic-pole-24 side, as shown in FIG. 4, straightly passes a perpendicular recording layer d4 of the disk D and reaches a soft magnetic layer d2. Accordingly, recording can be performed in a state where the magnetization of the perpendicular recording layer d4 is directed in the direction perpendicular to the disk surface D1. The magnetic flux which reaches the soft magnetic layer d2 returns to the auxiliary magnetic pole 26 via the soft magnetic layer d2. Here, the direction of magnetization is not influenced when the magnetic flux returns to the auxiliary magnetic pole 26. This is because an area of the auxiliary magnetic pole 26 which faces the disk surface D1 is larger than an area of the main magnetic pole 24 and hence, the magnetic density of the auxiliary magnetic pole 26 is large whereby a force large enough for inverting the magnetization is not generated. That is, the recording can be performed only on a main magnetic pole 24 side.

Further, since the main magnetic pole 24 is formed on the first inclined surface 22, it is possible to generate the recording magnetic field at a position as close as possible to a point where the localized near-field light R is generated. Accordingly, it is possible to generate the recording magnetic field in a pin-point manner at a local position of the disk D where a coercive force is lowered due to the near-field light R. As a result, it is possible to perform recording of information by a hybrid magnetic recording method in which the near-field light R and the recording magnetic field generated by both magnetic poles 24,26 cooperatively work. Further, the recording is performed by the perpendicular recording method and hence, recording is hardly influenced by a thermal fluctuation phenomenon or the like thus ensuring the stable recording. Accordingly, the reliability in writing can be enhanced.

Next, in reproducing information recorded in the disk D, the resistance of the reproducing element 29 is changed corresponding to a magnitude of a magnetic field leaked from the perpendicular recording layer d4 of the disk D. Then, the reproducing element 29 outputs a change of voltage to the control part 8 as electric signals. The control part 8 can perform the reproduction of information based on the electric signals.

Particularly, according to the near-field optical head 2 of this embodiment, the optical flux L can be introduced linearly toward the respective side surfaces of the polyhedron 35 by making use of the optical flux introducing means 21 and, at the same time, it is unnecessary to propagate the optical flux L in air different from the prior art and hence, it is possible to efficiently generate the near-field light R while suppressing the light introduction loss as much as possible. Further, the metal film 27 and the main magnetic pole 24 are formed on the first inclined surface 22 and the second inclined surface 23 which are arranged adjacent to each other and hence, a point where the near-field light R is generated and a point where the recording magnetic field is generated can be made as close as possible to each other. That is, it is possible to generate the recording magnetic field at a peak position of a heating temperature due to the near-field light R. Accordingly, recording can be surely performed and, at the same time, high-density recording can be realized.

Further, by merely forming the metal film 27 and the main magnetic pole 24 on the first inclined surface 22 and the second inclined surface 23, the generation of the near-field light R and the generation of the recording magnetic field can be realized simultaneously and hence, the near-field optical head can have the simple structure without adopting the complicated structure of the related art. Accordingly, the constitution of the near-field optical head can be simplified thus realizing the miniaturization of the near-field optical head.

Further, in this embodiment, the side surfaces of the polyhedron 35 are used as the first inclined surface 22 and the second inclined surface 23. In this manner, the first inclined surface 22 and the second inclined surface 23 can be formed at a time by merely forming the polyhedron 35 on the opposedly-facing surface 20a of the slider 20 and hence, both inclined surfaces 22, 23 can be aligned with each other with high accuracy. Accordingly, a point where the near-field light R is generated and a point where the recording magnetic field is generated can be aligned with each other as accurately as possible and hence, it is possible to perform more reliable recording.

In this embodiment, although recording is performed by an air floating method in which the slider 20 is floated, the positive pressure pad 38 has approximately the same height as the height of the polyhedron 35 and hence, it is possible to float the slider 20 in a stable manner while preventing the polyhedron 35 from coming into contact with the disk D. The stable recording can be performed also from this aspect.

Figure 6:
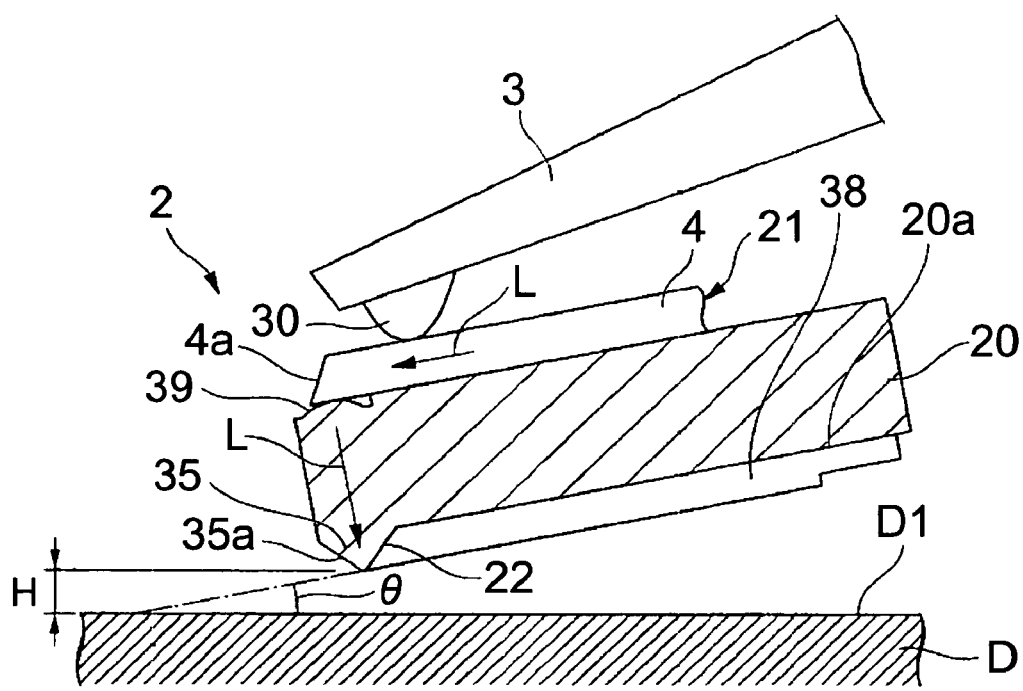
FIG. 6 is a view showing a state where the near-field optical head shown in FIG. 2 is floated above a disk in an inclined state.

Further, the side surface 35a of the polyhedron 35 also functions as a portion of an outflow-end-side end surface of the slider 20 and hence, it is possible to generate the near-field light R and the recording magnetic field at a position as close as possible to a distal end side (outflow end side) of the slider 20. Here, to explain the posture of the slider 20 when the slider 20 is floated in more detail, as shown in FIG. 6, the slider 20 is not horizontal with respect to the disk surface D1 but is slightly inclined with respect to the disk surface D1. To be more specific, in a state where the outflow end side of the slider 20 approaches the disk D, the slider 20 is inclined such that an angle θ made by the disk surface D1 and the ABS of the slider 20 is kept at a minute angle (approximately 1° to 5°, for example). Accordingly, in the direction extending toward an inflow end from an outflow end of the slider 20, a distance H between the slider 20 and the disk surface D1 is gradually increased. That is, the slider 20 assumes a state where the outflow end side of the slider 20 approaches closest to the disk surface D1.

Even when the slider 20 is floated with inclination in this manner, it is possible to generate the near-field light R and the recording magnetic field on the outflow end side of the slider 20 which approaches closest to the disk D and hence, stable recording can be realized thus enhancing reliability of the near-field optical head.

Further, in this embodiment, the sensitive reproducing element 29 is allowed to approach closest to the disk D. Accordingly, the reproduction performance can be enhanced.

As described above, according to the near-field optical head 2 of this embodiment, the near-field optical head 2 can efficiently generate the near-field light R while achieving the miniaturization thereof and, at the same time, can enhance reliability in writing thus realizing high-density recording.

Further, the information recording/reproducing device 1 of this embodiment includes the above-mentioned near-field optical head 2 and hence, the information recording/reproducing device 1 exhibits high reliability in writing and hence, the information recording/reproducing device 1 can cope with high density recording thus realizing high-quality recording. Further, the miniaturization of the information recording/reproducing device 1 can be also realized simultaneously.

In the above-mentioned embodiment, the metal film 27 is formed also on the side surface 35b which faces the second inclined surface 23 in an opposed manner. However, the metal film 27 may be formed only on the second inclined surface 23. Also in this case, the point where the near-field light R is generated and the point where the recording magnetic field is generated can be aligned with each other as much as possible and hence, such a constitution can acquire the substantially same manner of operation and advantageous effects. However, the formation of two metal films 27 is more preferable since the near-field light R can be formed from the optical flux L without wasting the optical flux L. Further, out of four side surfaces of the polyhedron 35, any side surfaces may be used as the first inclined surface 22 and the second inclined surface 23 provided that these inclined surfaces are two neighboring surfaces.

Further, as shown in FIG. 5, by adjusting a length L1 of a long side of the first inclined surface 22, a distance between two metal films 27 can be freely adjusted so that the degree of localization of the near-field light R which is generated between both metal films 27 can be controlled. Further, by adjusting a thickness T of the insulation film 25, a gap between the main magnetic pole 24 and the auxiliary magnetic pole 26 can be easily adjusted.

Figure 7:
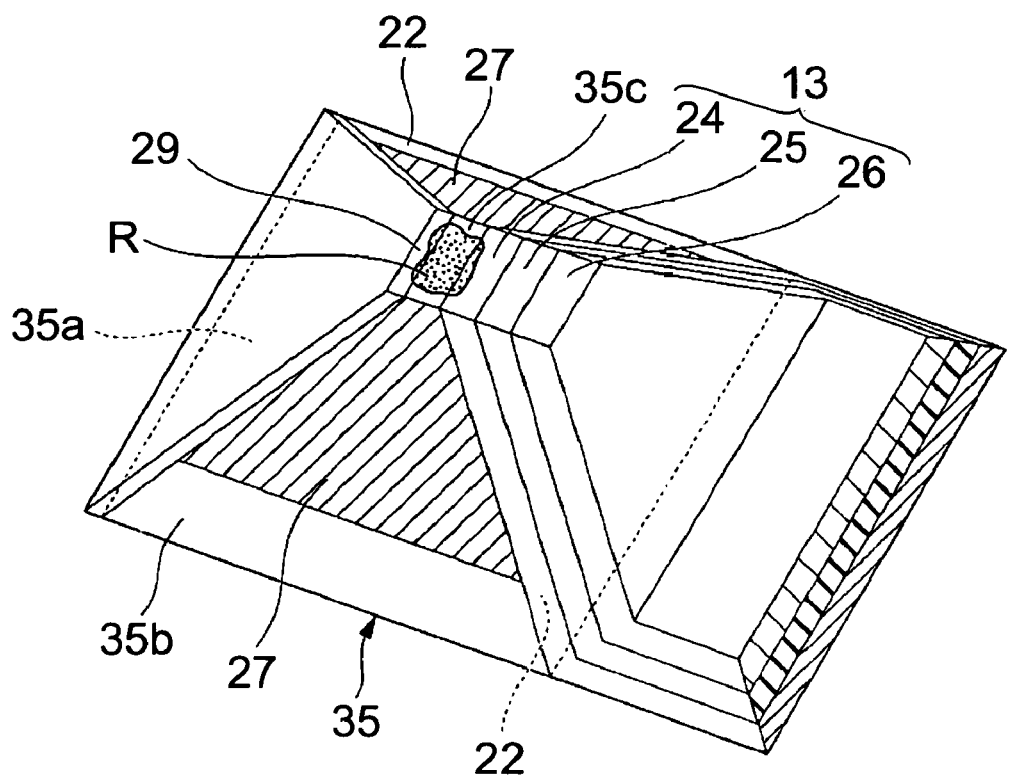
FIG. 7 is a view showing a modification of the near-field optical head shown in FIG. 2, and also is a perspective view of a polyhedron having a pyramidal shape.

Further, in the above-mentioned embodiment, the polyhedron 35 is formed such that only the first inclined surface 22 and the side surface 35a which faces the first inclined surface 22 in an opposed manner have sides thereof overlapped with each other at a peak portion. However, the formation of the polyhedron 35 is not limited to such a case, and the polyhedron 35 may be formed into a pyramidal shape so that an end surface 35c becomes parallel to the disk surface D1 as shown in FIG. 7.

Due to such a constitution, the near-field light R generated by the metal film 27 is liable to leak to the outside. Accordingly, it is possible to generate the near-field light R having higher intensity and hence, the disk D can be heated more efficiently thus easing recording of information.

(Second Embodiment)

Figure 8:
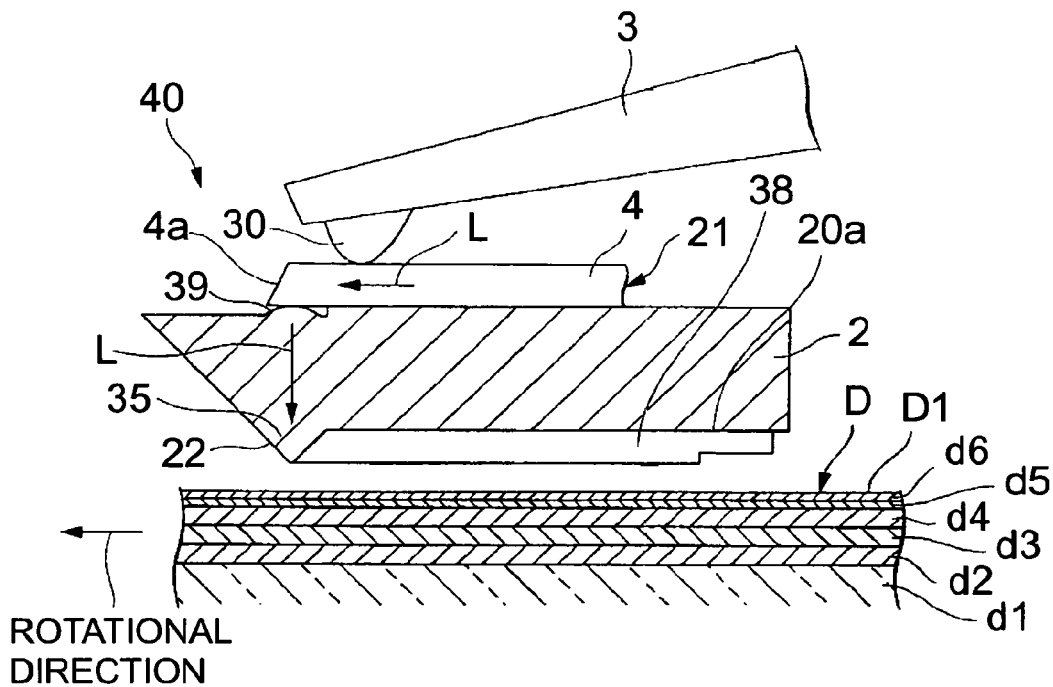
FIG. 8 is a cross-sectional view showing a second embodiment of the near-field optical head according to the present invention.
Figure 9:
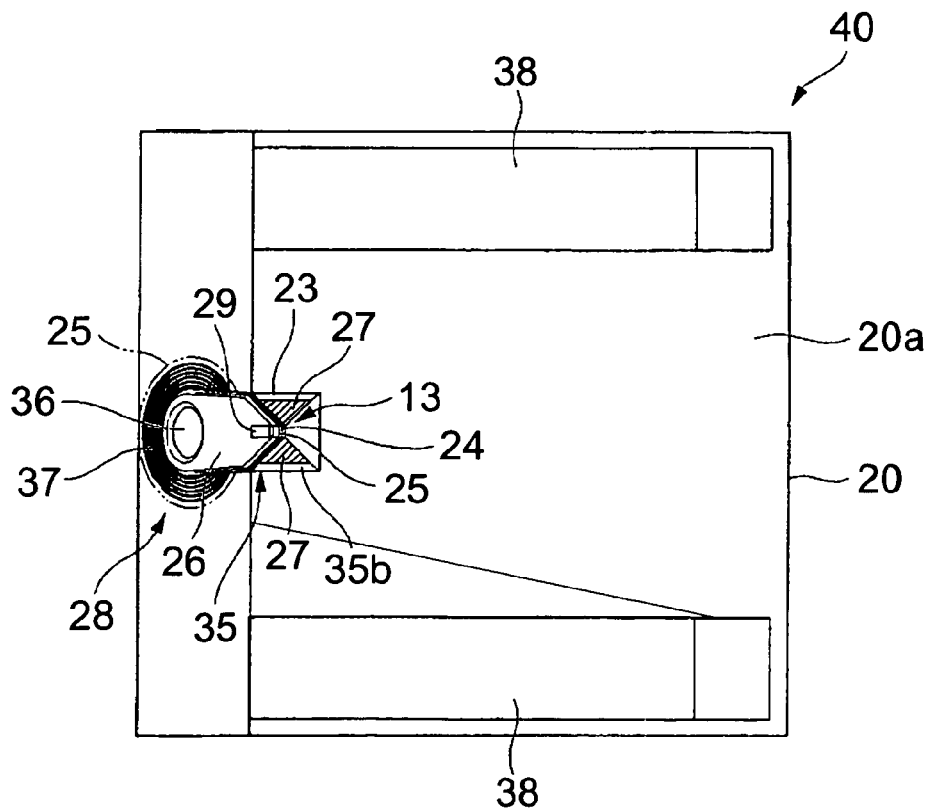
FIG. 9 is a view of the near-field optical head shown in FIG. 8 as viewed from a disk surface side.
Figure 10:
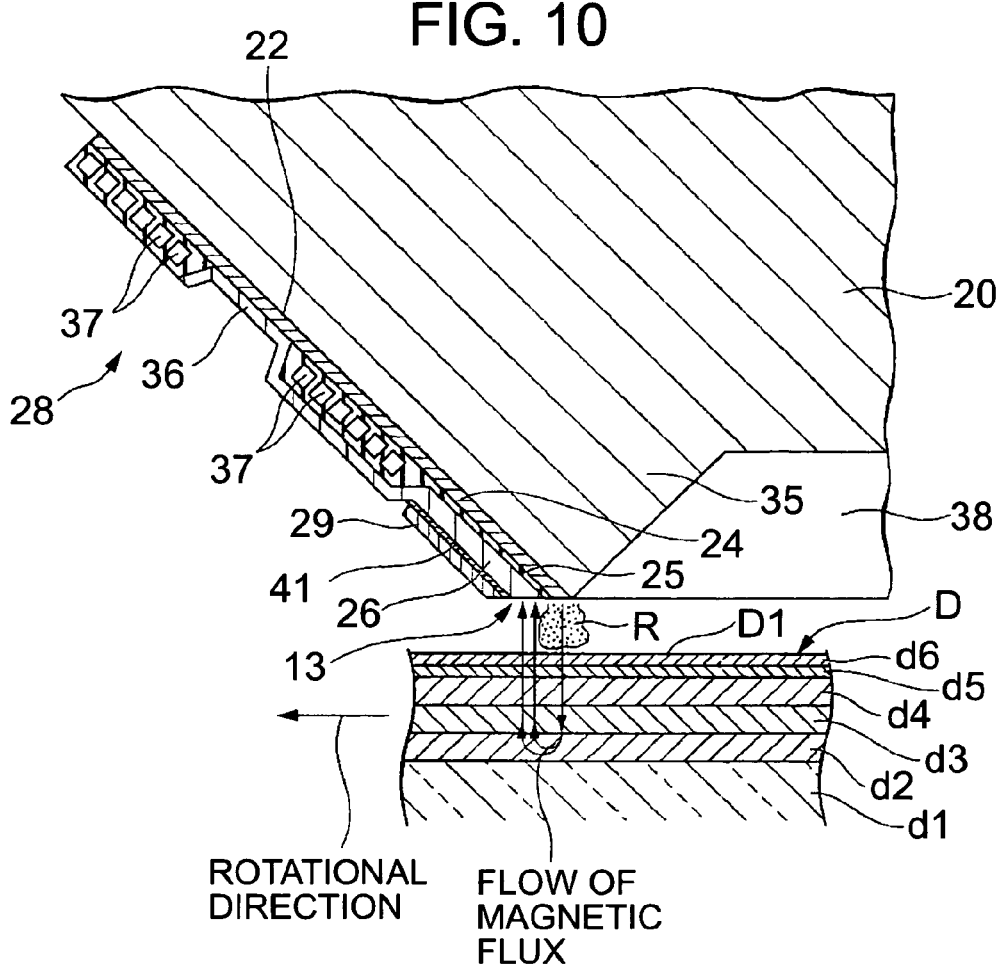
FIG. 10 is an enlarged cross-sectional view of a main magnetic pole and parts arranged around the main magnetic pole showing a state where information is being recorded on a disk by the near-field optical head shown in FIG. 8.

Next, a second embodiment of the near-field optical head according to the present invention is explained in conjunction with FIG. 8 to FIG. 10. Here, in the second embodiment, constitutional parts identical to the constitutional parts of the first embodiment are given the same symbols, and their repeated explanation is omitted. The difference between the second embodiment and the first embodiment lies in a point that a main magnetic pole 24 is formed on a different surface of the polyhedron 35. Further, in FIG. 8, a metal film 27, the main magnetic pole 24 and the like are omitted from the drawing for facilitating the understanding of the drawing.

That is, in the near-field optical head 40 of this embodiment, as shown in FIG. 8 to FIG. 10, out of four side surfaces of the polyhedron 35, a side surface of polyhedron 35 which also functions as a portion of an outflow-end-side end surface of the slider 20 forms a first inclined surface 22, and the main magnetic pole 24 is formed on the first inclined surface 22. Further, the slider 20 of this embodiment has an outflow end side thereof cut obliquely at the same angle with the first inclined surface 22.

Further, the main magnetic pole 24 is formed over an area ranging from the first inclined surface 22 to the outflow-end-side end surface. In the same manner as the first embodiment, an auxiliary magnetic pole 26 is stacked on the main magnetic pole 24 with an insulation film 25 sandwiched between both magnetic poles, and a magnetic circuit 36 and a coil 37 are provided. Further, a reproducing element 29 of this embodiment is stacked on the auxiliary magnetic electrode 26 with the insulation film 41 sandwiched between the reproducing element 29 and the auxiliary magnetic pole 26.

The near-field optical head 40 having such a constitution can generate a recording magnetic field by arranging a position of the main magnetic pole 24 further closer to an outflow end side of the slider 20 compared to the first embodiment. Accordingly, even when the slider 20 is inclined at the time of floating the slider 20 by air, it is possible to perform recording in a more stable manner. Further, the reproducing element 29 can be also positioned on the outflow-end-side of the slider 20 and hence, the reproduction performance can be further enhanced.

(Third Embodiment)

Figure 11:
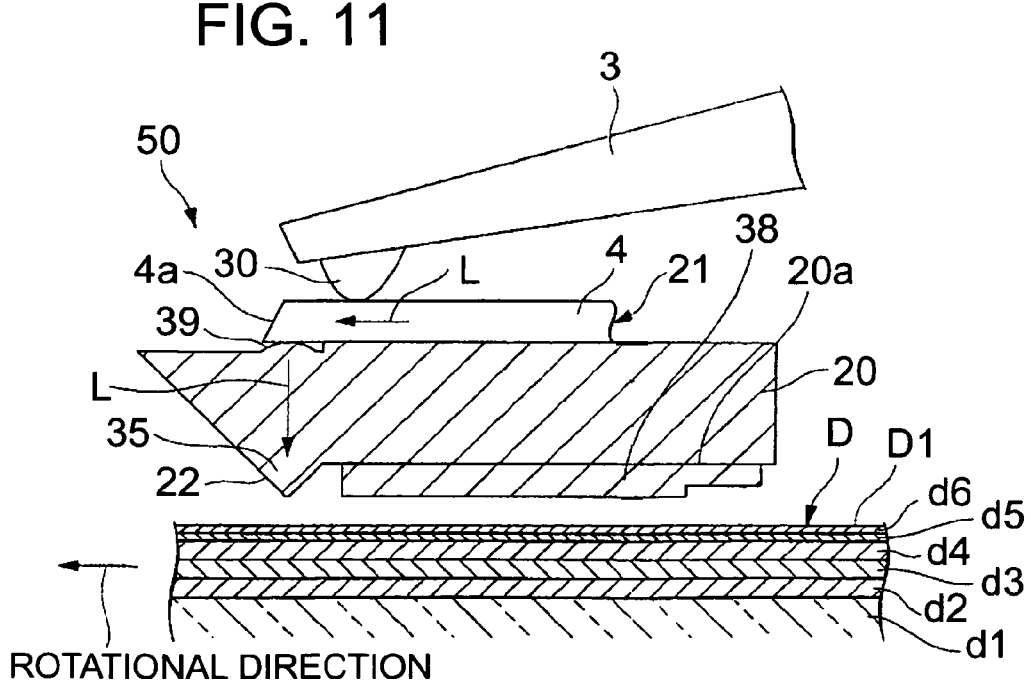
FIG. 11 is a cross-sectional view of a third embodiment of the near-field optical head according to the present invention.
Figure 12:
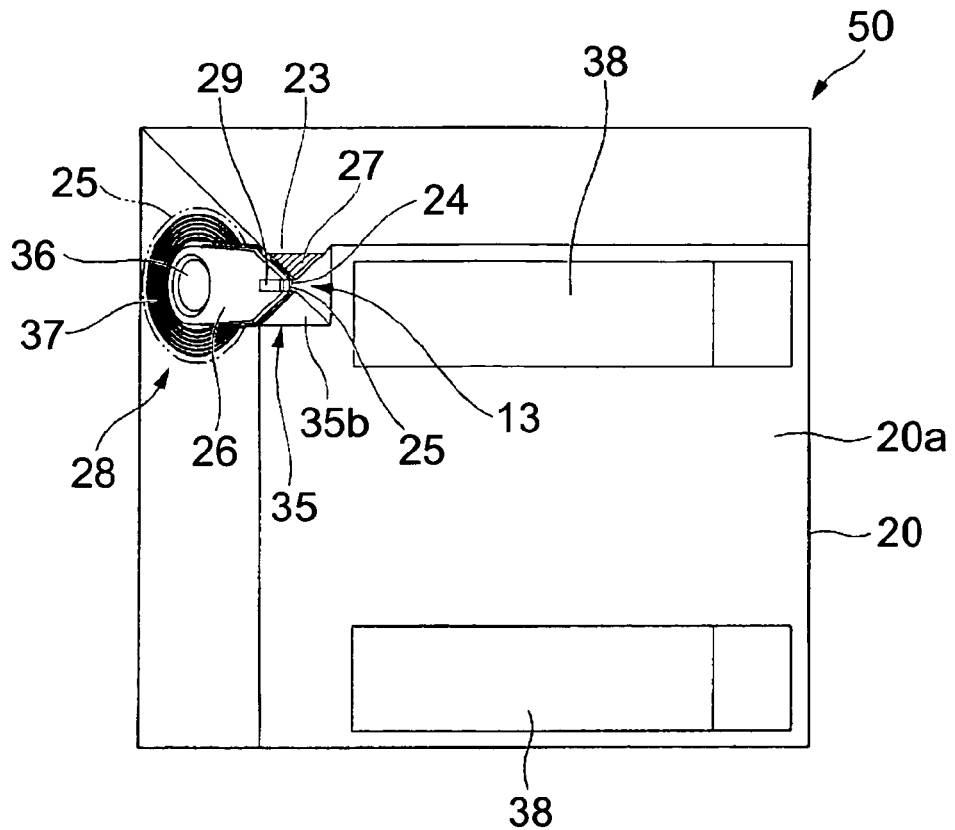
FIG. 12 is a view of the near-field optical head shown in FIG. 11 as viewed from a disk surface side.

Next, a third embodiment of the near-field optical head according to the present invention is explained in conjunction with FIG. 11 and FIG. 12. Here, in the third embodiment, constitutional parts identical to the constitutional parts of the second embodiment are given the same symbols, and thus their repeated explanation is omitted. The difference between the third embodiment and the second embodiment lies in that the position of the polyhedron 35 differs between these embodiments. Further, in FIG. 11, a metal film 27, a main magnetic pole 24 and the like are omitted from the drawing for facilitating the understanding of the drawing.

That is, in a near-field optical head 50 of this embodiment, as shown in FIG. 11 and FIG. 12, the polyhedron 35 is formed in a state where the polyhedron 35 is arranged close to one side of a slider 20. Further, corresponding to such formation of the polyhedron 35, the lens 39 and the optical waveguide 4 are also provided in a state where these parts are arranged close to one side of the slider 20, and the polyhedron 35 is positioned approximately right below the lens 39. Further, the slider 20 of this embodiment has an end surface at one side thereof cut obliquely at the same angle as the second inclined surface 23. Further, the metal film 27 is formed only on the second inclined surface 23. The near-field optical head 50 having such a constitution also can acquire the substantially equal advantageous effects as the second embodiment.

(Fourth Embodiment)

Figure 13:
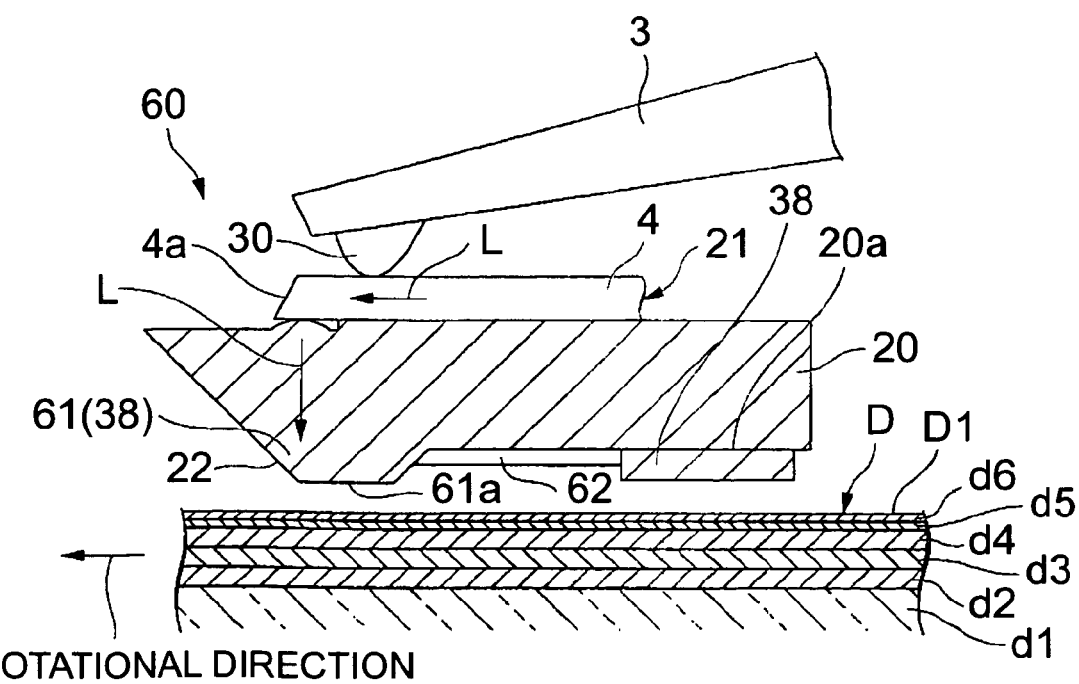
FIG. 13 is a cross-sectional view of a fourth embodiment of the near-field optical head according to the present invention.
Figure 14:
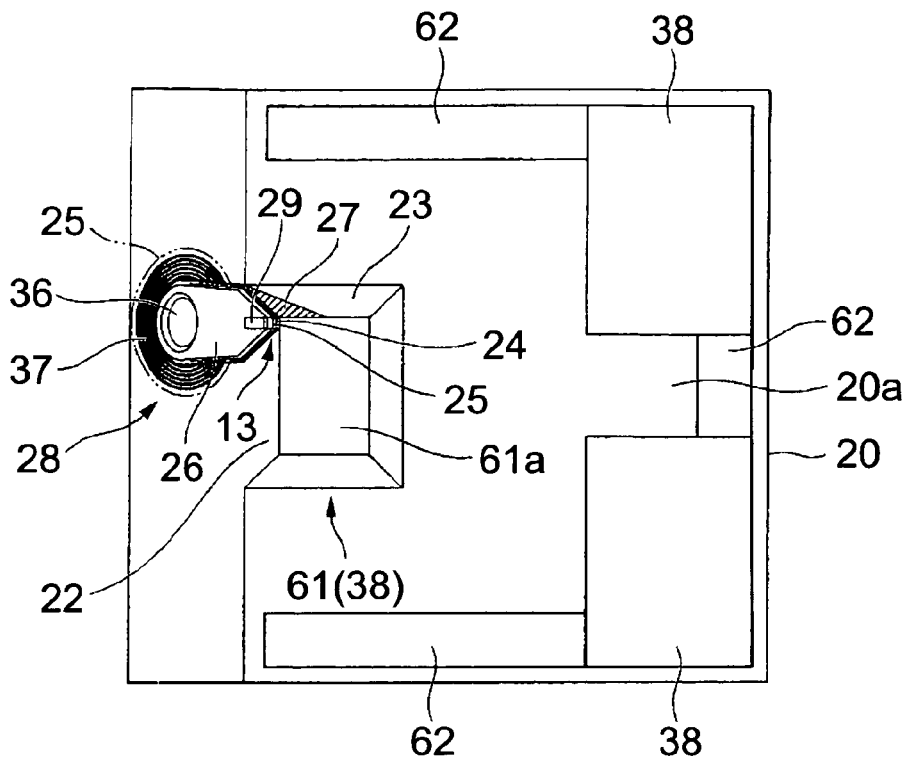
FIG. 14 is a view of the near-field optical head shown in FIG. 13 as viewed from a disk surface side.

Next, a fourth embodiment of the near-field optical head according to the present invention is explained in conjunction with FIG. 13 and FIG. 14. Here, in the fourth embodiment, constitutional parts identical to the constitutional parts of the second embodiment are given the same symbols, and thus their repeated explanation is omitted. The difference between the fourth embodiment and the second embodiment lies in that a polyhedron 61 also functions as one of positive pressure pads 38 which generate a pressure for floating the slider 20. Further, in FIG. 13, a metal film 27, the main magnetic pole 24 and the like are omitted from the drawing for facilitating the understanding of the drawing.

That is, in the near-field optical head 60 of this embodiment, as shown in FIG. 13 and FIG. 14, the polyhedron 61 has a pyramidal shape and an end surface 61a of the polyhedron 61 is arranged parallel to the disk surface D1. The polyhedron 61 functions as one of the positive pressure pads 38. That is, the end surface 61a of the polyhedron 61 functions as the ABS. Further, two positive pressure pads 38 are further provided on an inflow end side of the opposedly-facing surface 20a of the slider 20. These two positive pressure pads 38 are formed in a slightly spaced-apart manner.

Further, the near-field optical head 60 of this embodiment includes negative pressure pads (negative pressure generating portions) 62 which are formed on the opposedly-facing surface 20a and generates a negative pressure for sucking the slider 20 toward the disk D side by making use of an air flow generated by the rotating disk D. The negative pressure pads 62 are formed into a rail shape having a height smaller than a height of the positive pressure pads 38 and are formed along peripheries of the slider 20.

In the near-field optical head 60 having such a constitution, the polyhedron 61 also functions as one of the positive pressure pads 38 and hence, the constitution of the near-field optical head 60 can be further simplified thus realizing the simple designing of the near-field optical head 60. Further, it is possible to eliminate factors which impede the flow of air from the opposedly-facing surface 20a except for the positive pressure pads 38 and hence, a floating quantity of the slider 20 can be easily controlled. Accordingly, it is possible to accurately adjust the slider 20 based on the floating quantity as designed. Further, since the near-field optical head 60 includes the negative pressure pad 62 and hence, by making use of the positive pressure which floats the slider 20 and the negative pressure which sucks the slider 20, it is possible to float the slider 20 by air in a more stable state while suppressing floating irregularities. Accordingly, it is possible to accurately apply the near-field light R and the recording magnetic field to a targeted position of the disk D thus enhancing the reliability of the optical head.

(Fifth Embodiment)

Figure 15:
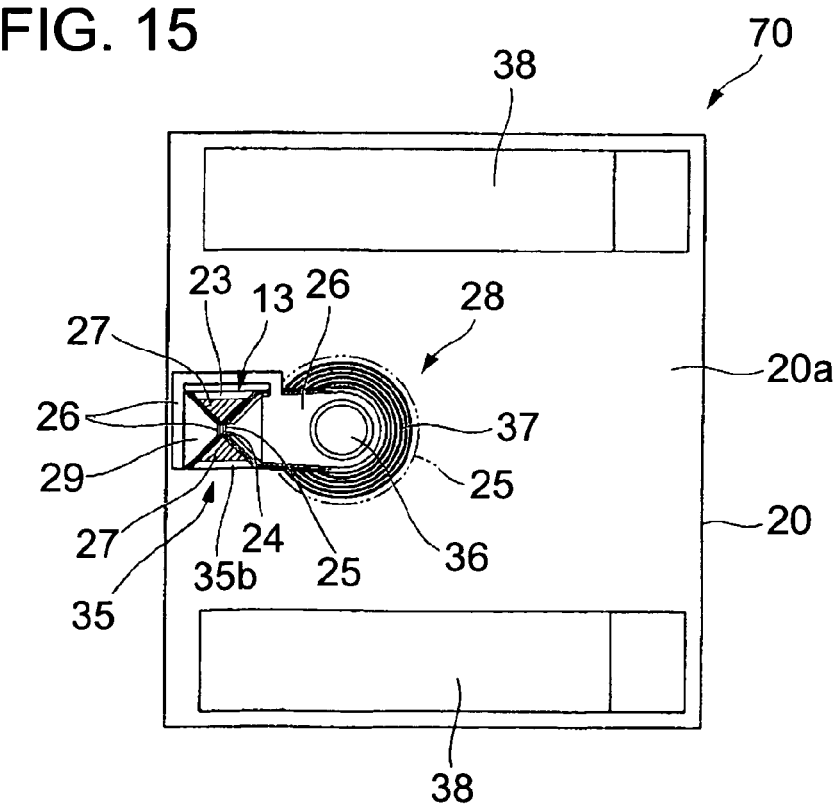
FIG. 15 is a view showing a fifth embodiment of the near-field optical head according to the present invention, and also is a view of the near-field optical head as viewed from a disk surface side.
Figure 16:
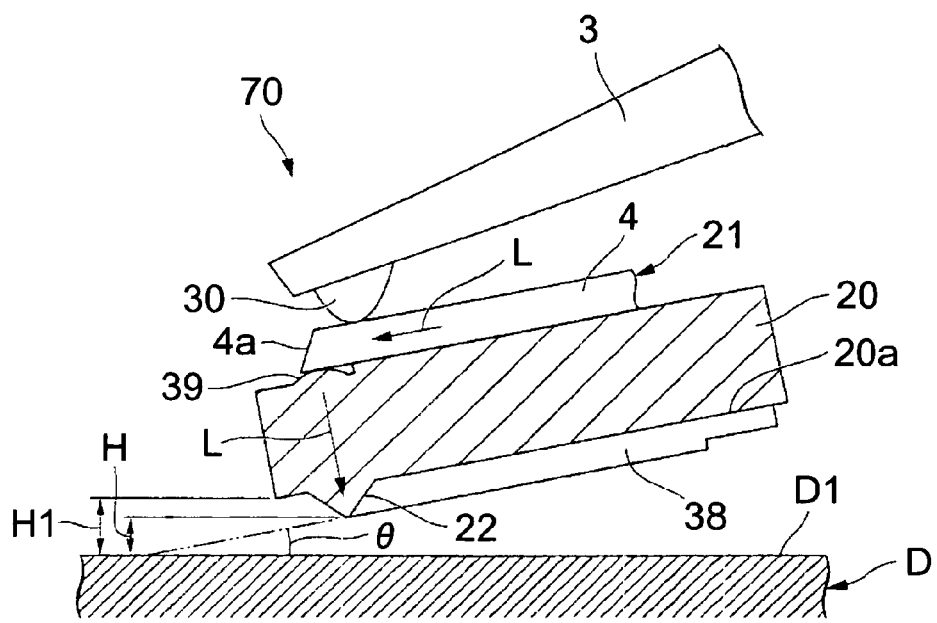
FIG. 16 is a cross-sectional view of the near-field optical head shown in FIG. 15.
Figure 17:
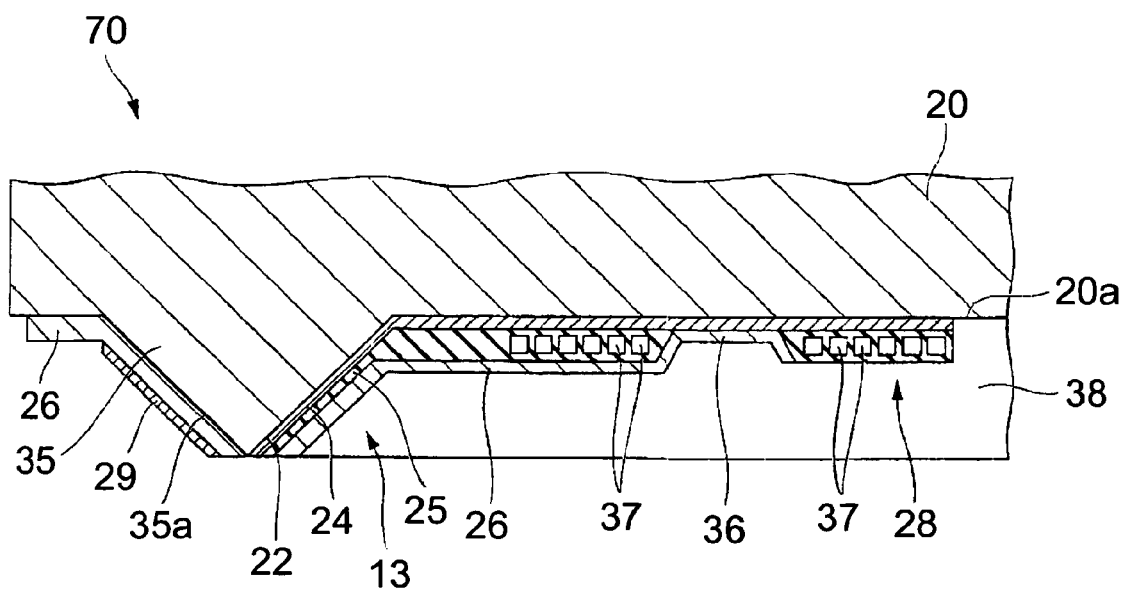
FIG. 17 is an enlarged cross-sectional view showing a main magnetic pole of the near-field optical head shown in FIG. 15 and parts arranged around the main magnetic pole.

Next, a fifth embodiment of the near-field optical head according to the present invention is explained in conjunction with FIG. 15 to FIG. 17. Here, in the fifth embodiment, constitutional parts identical to the constitutional parts of the first embodiment are given the same symbols, and thus their explanation is omitted. The difference between the fifth embodiment and the first embodiment lies in that the auxiliary magnetic pole 26 is divided in two at a middle portion thereof.

In FIG. 16, a metal film 27, the main magnetic pole 24 and the like are omitted from the drawing for facilitating the understanding of the drawing. Further, FIG. 16 shows a case where the slider 20 is floated in an inclined manner by an angle $\theta$ with respect to the disk surface D1.

That is, in a near-field optical head 70 of this embodiment, as shown in FIG. 15 to FIG. 17, the auxiliary magnetic pole 26 is divided in two above the opposedly-facing surface 20a in the course of extending toward the first inclined surface 22. In the first embodiment, the polyhedron 35 is formed on the distal end side of the slider 20 such that one side surface 35a out of four side surfaces functions also as one portion of the side surface of the slider 20 on the outflow end side. In this embodiment, however, the polyhedron 35 is formed in a state where the polyhedron 35 is arranged slightly close to an inflow side of the slider 20 (a proximal end side of the beam 3). Accordingly, a slight gap is ensured between the polyhedron 35 and the side surface of the slider 20 on the outflow end side. As shown in FIG. 16, the lens 39 and the optical waveguide 4 are formed in a state where the lens 39 and a mirror surface 4a are arranged slightly closer to the inflow end side in conformity with the position of the polyhedron 35 so that the lens 39 and a mirror surface 4a are positioned right above the polyhedron 35.

Then, as shown in FIG. 15 and FIG. 17, one branched portion of the auxiliary magnetic pole 26 is formed on the opposedly-facing surface 20a such that the branched portion is routed around a periphery of the polyhedron 35 and reaches the above-mentioned gap and, thereafter, is formed on the side surface 35a of the polyhedron 35. That is, the auxiliary magnetic pole 26 is formed such that the divided auxiliary magnetic poles 26 sandwich the polyhedron 35 therebetween. In this embodiment, the reproducing element 29 is formed on the auxiliary magnetic pole 26 which is formed on the side surface 35a.

The near-field optical head 70 having such a constitution can acquire the following advantageous effects in addition to the manner of operation and advantageous effects substantially equal to the manner of operation and advantageous effects of the first embodiment.

That is, the auxiliary magnetic pole 26 is divided in two, and the divided auxiliary magnetic pole 26 are formed on two side surfaces (side surface 35a, first inclined surface 22) so as to face each other in an opposed manner with the polyhedron 35 sandwiched therebetween. Due to such a constitution, it is possible to increase an area of the auxiliary magnetic pole 26 which faces the disk surface D1 in an opposed manner compared to the area of the auxiliary magnetic pole 26 in the first embodiment. Accordingly, the magnetic flux density on the auxiliary magnetic pole 26 side can be further reduced. Due to such a constitution, in performing writing by applying a recording magnetic field to the disk D, it is possible to make it more difficult for a magnetic flux which returns to the auxiliary magnetic pole 26 from the soft magnetic layer d2 to influence writing. As a result, the near-field optical head 70 can surely perform writing only on the main magnetic pole 24 side thus further enhancing recording property.

Further, as shown in FIG. 16, in this embodiment, the side surface of the slider 20 on the outflow side projects toward the distal end side of the beam 3 from the polyhedron 35 by an amount corresponding to the above-mentioned gap. However, there is no possibility that this portion approaches the disk D side further than a peak point of the polyhedron 35. That is, the outflow end side of the slider 20 assumes a state where the outflow end side of the slider 20 is spaced apart from the disk surface D1 by a distance H1 larger than a floating quantity H. Accordingly, also in this embodiment, there is no possibility that the slider 20 and the disk surface D1 interfere with each other when the slider 20 is floated.

(Sixth Embodiment)

Figure 18:
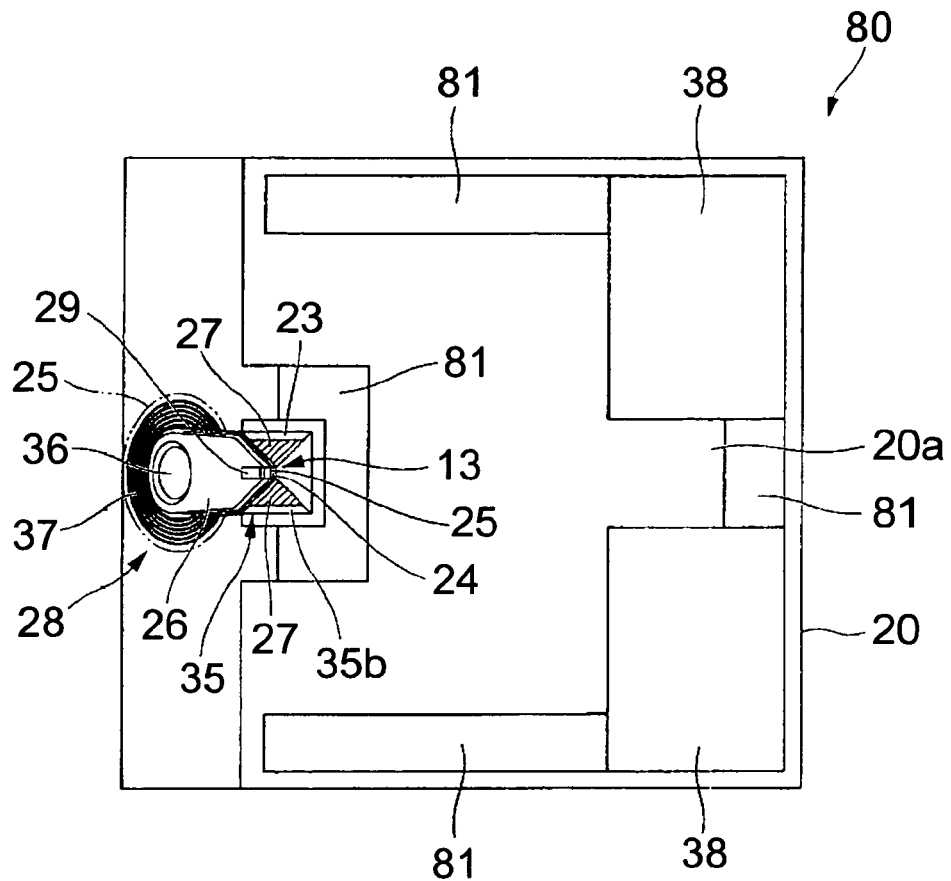
FIG. 18 is a view showing a sixth embodiment of the near-field optical head according to the present invention, and also is a view of the near-field optical head as viewed from a disk surface side.
Figure 19:
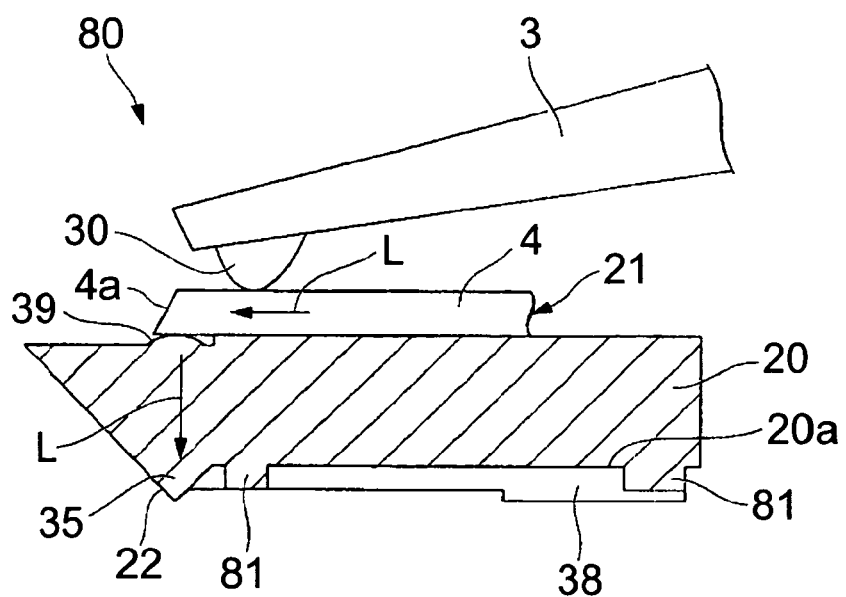
FIG. 19 is a cross-sectional view of the near-field optical head shown in FIG. 18.

Next, a sixth embodiment of the near-field optical head according to the present invention is explained in conjunction with FIG. 18 and FIG. 19. Here, in the sixth embodiment, constitutional parts identical to the constitutional parts of the second embodiment are given the same symbols, and their repeated explanation is omitted. The difference between the sixth embodiment and the second embodiment lies in a point that a negative pressure pad (negative pressure generating portion) 81 is formed so as to surround a portion of periphery of the polyhedron 35.

Further, in FIG. 19, the metal film 27, the main magnetic pole 24 and the like are omitted from the drawing for facilitating the understanding of the drawing.

That is, in a near-field optical head 80 of this embodiment, as shown in FIG. 18 and FIG. 19, a plurality of negative pressure pads 81 and a plurality of positive pressure pads 38 are formed on the opposedly-facing surface 20*a* of the slider 20. With respect to the positive pressure pads 38 out of these pressure pads, two positive pressure pads 38 are formed on the inflow end side of the opposedly-facing surface 20*a* in a slightly spaced apart manner from each other. On the other hand, one of the plurality of negative pressure pads 81 is formed in a U-shape as viewed in a plan view, and is arranged on the outflow end side so as to surround a portion of periphery of the polyhedron 35. This U-shaped negative pressure pad 81 functions as a trailing pad. Further, the remaining negative pressure pads 81 are formed along peripheries of the slider 20.

The near-field optical head 80 having such a constitution can acquire an advantageous effect that the slider 20 can be floated in a more stable manner and also at a small height in addition to the manner of operation and advantageous effects substantially equal to the manner of operation and advantageous effects of the second embodiment. That is, since the near-field optical head 80 of this embodiment includes the negative pressure pads 81 and the positive pressure pads 38 in the same manner as the fourth embodiment, by making use of a balance between the positive pressure which floats the slider 20 and the negative pressure which sucks the slider 20, the floating irregularities can be suppressed more compared to the second embodiment and hence, it is possible to float the slider 20 in a more stable state. Accordingly, it is possible to float the slider 20 at a smaller height. As a result, it is possible to realize the higher-density recording.

The technical scope of the present invention is not limited to the above-mentioned embodiments, and it is possible to add various modifications to those embodiments without departing from the gist of the present invention.

For example, in the above-mentioned respective embodiments, the explanation has been made by taking air-floating-type information recording/reproducing device 1 which floats the near-field optical head 2, 40, 50, 60, 70, 80 as the example. The present invention, however, is not limited to such examples. That is, provided that the slider 20 is arranged to face the disk surface D1 in an opposed manner, the disk D and the slider 20 may be brought into contact with each other. That is, a contact-slider-type head may be also used. Also in this case, the near-field optical head can acquire the substantially equal manner of operation and advantageous effects.

Further, in the above-mentioned respective embodiments, the side surfaces of the polyhedron 35, 61 are made use of as the first inclined surface 22 and the second inclined surface 23. However, the present invention is not limited to such a case. The first inclined surface 22 and the second inclined surface 23 may be formed in any mode, provided that the first inclined surface 22 and the second inclined surface 23 are formed on the slider 20 in a projecting manner toward the disk D from the oppositely-facing surface 20*a* in an obliquely inclined state with respect to an optical axis, and the first inclined surface 22 and the second inclined surface 23 are arranged adjacent to each other while sharing one side in common.

Figure 20:
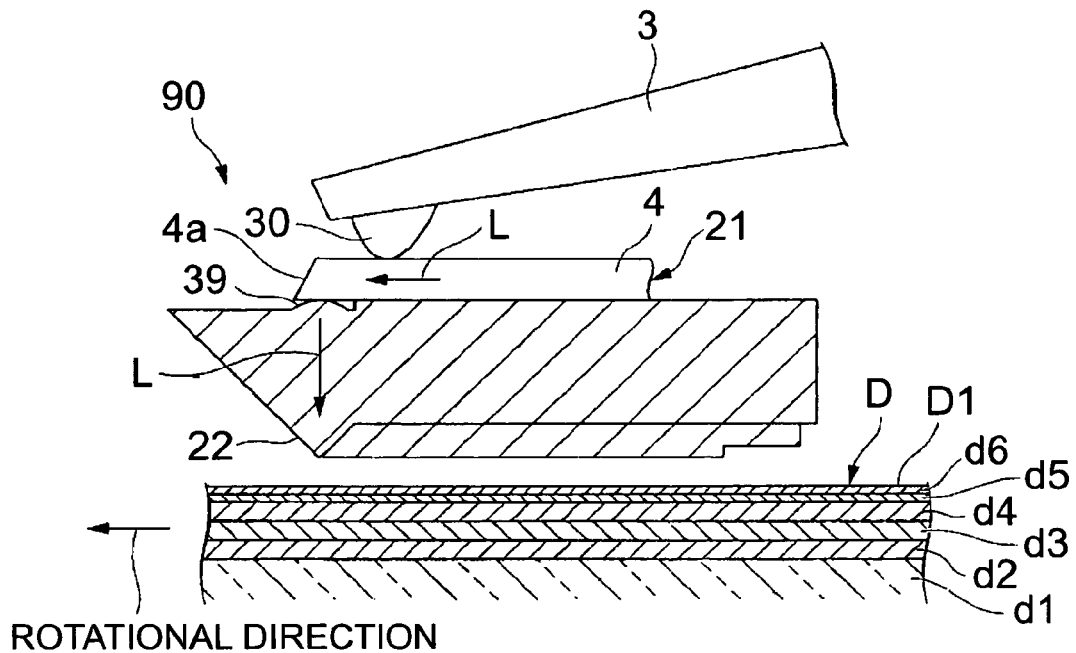
FIG. 20 is a cross-sectional view showing a modification of the near-field optical head according to the present invention.
Figure 21:
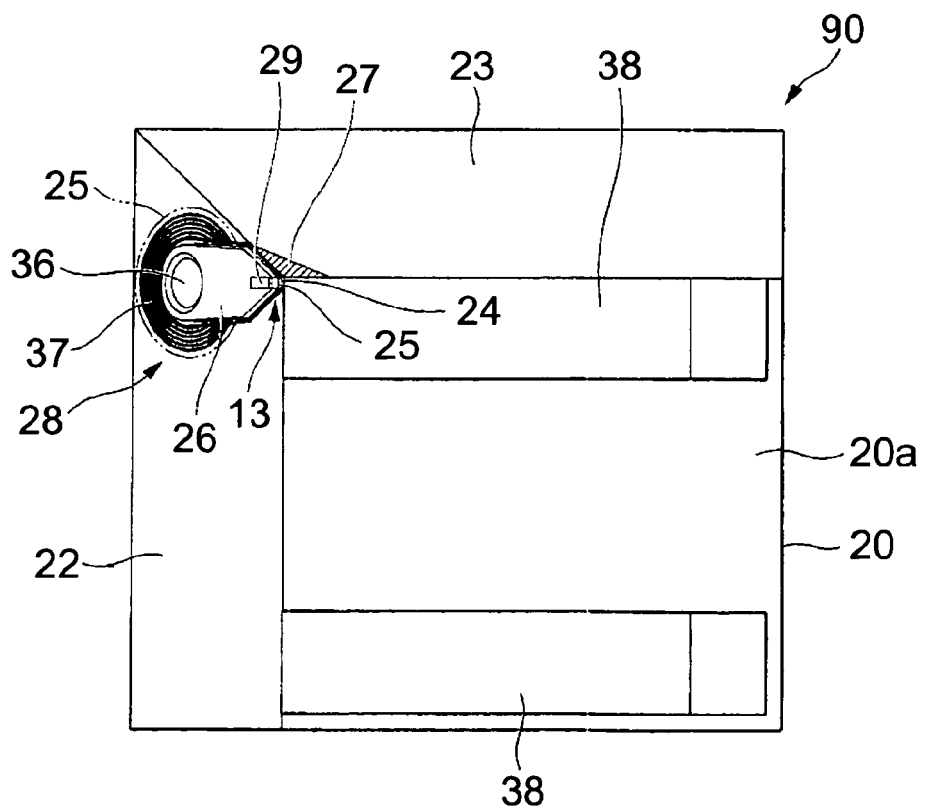
FIG. 21 is a view of the near-field optical head shown in FIG. 20 as viewed from a disk surface side.

For example, as shown in FIG. 20 and FIG. 21, both an outflow end side and one side of the slider 20 may be cut obliquely so as to form two inclined surfaces, and the inclined surfaces may be used as the first inclined surface 22 and the second inclined surface 23. A near-field optical head 90 shown in FIG. 20 and FIG. 21 is an example in which an outflow-end-side inclined surface of the slider 20 constitutes the first inclined surface 22, and the main magnetic pole 24 is formed on the first inclined surface 22. Further, FIG. 20 and FIG. 21 shows an example where two positive pressure pads 38 are formed, and the positive pressure pads 38 have approximately the same height as the height of the first inclined surface 22 and the second inclined surface 23 in the same manner as the first embodiment. The near-field optical head 90 having such a constitution can also acquire the substantially equal manner of operation and advantageous effects.

Figure 22:
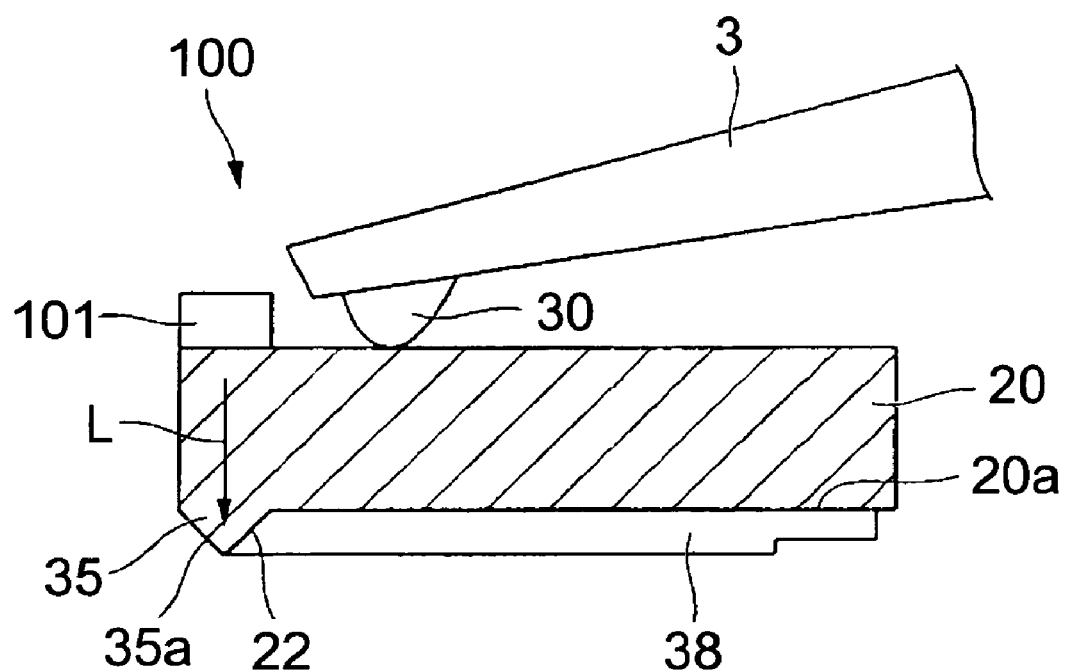
FIG. 22 is a cross-sectional view showing another modification of the near-field optical head according to the present invention.

Further, in the above-mentioned respective embodiments, the explanation has been made by taking the example where the optical flux introducing means 21 is constituted of the lens 39 and the optical waveguide 4, and the optical flux L is introduced into the polyhedron 35. The present invention, however, is not limited to such an example. For example, as shown in FIG. 22, a near-field optical head 100 may be configured such that a laser beam source 101 which functions as an optical flux introducing means may be arranged on an upper surface of the slider 20 right above the polyhedron 35, and an optical flux (laser beams) L may be directly radiated toward the polyhedron 35 from the laser beam source 101. Also in this case, the near-field optical head 100 can acquire the substantially equal manner of operation and advantageous effects. Particularly, according to the near-field optical head 100 having such a constitution, the optical waveguide 4 and the lens 39 become unnecessary and hence, the constitution of the near-field optical head 100 can be simplified. Further, the near-field optical head 100 can be manufactured at a low cost due to the decrease of the number of parts, and the mass production of the near-field optical heads 100 can be realized.

According to the near-field optical head of the present invention, it is possible to generate the near-field light efficiently while realizing the miniaturization of the near-field optical head. Further, it is possible to realize high-density recording by enhancing reliability in writing. Further, according to the information recording/reproducing device of the present invention, due to the provision of the above-mentioned near-field optical head, reliability in writing is high and hence, the information recording/reproducing device can cope with high-density recording thus realizing high-quality recording. Further, it is also possible to realize the miniaturization of the information recording/reproducing device.

The invention claimed is:

1. A near-field optical head which generates a near-field light from an introduced optical flux and thus heats a magnetic recording medium that undergoes rotation in a fixed direction and which applies a recording magnetic field in a direction perpendicular to the magnetic recording medium to cause magnetization inversion and thus record information on the magnetic recording medium, the near-field optical head comprising:
a slider configured to be arranged in a state in which a surface of the slider is disposed opposite to and confronts a surface of the magnetic recording medium, the slider having first and second inclined surfaces projecting from the surface of the slider toward the magnetic recording medium in an inclined manner with respect to an optical axis of the introduced optical flux in the state in which the surface of the slider confronts the surface of the magnetic recording medium, the first and second inclined surfaces being arranged adjacent to each other so as to share one side of the slider in common, the first inclined surface including at least portion of a distal end surface of the slider;
a plurality of convex-shaped pressure generating portions formed on the surface of the slider that confronts the surface of the magnetic recording medium for generating pressure for floating the slider by making use of an air flow generated by rotation of the magnetic recording medium, each of the pressure generating portions having a height substantially equal to a height of the first inclined surface and a height of the second inclined surface;
optical flux introducing means for introducing the optical flux into the slider and toward the surface of the slider confronting the surface of the magnetic recording medium;
a recording element formed on the first inclined surface of the slider, the recording element comprising a main magnetic pole and an auxiliary magnetic pole stacked one over another with an insulation film interposed therebetween;
a metal film formed on the other of the first inclined surface and the second inclined surface of the slider, the metal film allowing the introduced optical flux to propagate along an interface between the metal film and the other of the first and second inclined surfaces and thereafter generating from the introduced optical flux near-field light which extends toward the surface of the magnetic recording medium; and
magnetic field generating means for generating a recording magnetic field between the main magnetic pole and the auxiliary magnetic pole of the recording element.

2. A near-field optical head according to claim 1; further comprising a polyhedron formed on the slider so as to project toward the surface of the magnetic recording medium in the state in which the surface of the slider confronts the surface of the magnetic recording medium, the polyhedron having four side surfaces which are inclined with respect to the optical axis of the introduced optical flux, one of the four side surfaces corresponding to at least a portion of a distal end surface of the slider and two neighboring surfaces of the four side surfaces corresponding to the first inclined surface and the second inclined surface, respectively; and further comprising a plurality of convex-shaped pressure generating portions formed on the surface of the slider for generating pressure for floating the slider by making use of an air flow generated by rotation of the magnetic recording medium, each of the pressure generating portions having a height substantially equal to a height of the first inclined surface and a height of the second inclined surface.

3. A near-field optical head according to claim 2; wherein the polyhedron is formed in a pyramidal shape, the polyhedron having an end surface parallel to a surface of the magnetic recording medium.

4. A near-field optical head according to claim 2; wherein the polyhedron also functions as one of the pressure generating portions.

5. A near-field optical head according to claim 2; wherein the metal film is also formed on one of the surfaces of the polyhedron other than the surfaces of the polyhedron corresponding to the first and second inclined surfaces of the slider.

6. A near-field optical head according to claim 1; further comprising a negative pressure generating portion formed on the surface of the slider that confronts the surface of the magnetic recording medium for generating negative pressure for sucking the slider toward a magnetic recording medium side due to an air flow generated by rotation of the magnetic recording medium.

7. A near-field optical head according to claim 1; further comprising a reproducing element which outputs an electric signal corresponding to a magnitude of a magnetic field that leaks from the magnetic recording medium.

8. An information recording/reproducing device comprising:
a near-field optical head according to claim 1;
a beam movable in a direction parallel to a surface of the magnetic recording medium and supporting the near-field optical head on a distal end side thereof in a state where the near-field optical head is rotatable about two axes parallel to a surface of the magnetic recording medium and orthogonal to each other;
a light source for causing the optical flux to be incident on the optical flux introducing means;
an actuator supporting a proximal end side of the beam for moving the beam along the direction parallel to the surface of the magnetic recording medium;
a rotation driving part for rotating the magnetic recording medium; and
a control part for controlling an operation of the magnetic field generating means and an operation of the light source.

9. A near-field optical head according to claim 1; wherein the main magnetic pole is disposed directly on the one of the first and second inclined surfaces of the slider, the insulation film is disposed directly on the main magnetic pole, and the auxiliary magnetic pole is disposed directly on the insulation film.

10. A near-field optical head according to claim 1; wherein the recording element extends from the one of the first and second inclined surfaces of the slider to the surface of the slider that confronts the surface of the magnetic recording medium.

11. A near-field optical head according to claim 1; wherein the magnetic field generating means comprises a magnetic circuit connecting together the main magnetic pole and the auxiliary magnetic pole of the recording element, and a coil formed in the insulating film of the recording element and wound around the magnetic circuit.

12. A near-field optical head which generates a near-field light from an introduced optical flux and thus heats a magnetic recording medium that undergoes rotation in a fixed direction and which applies a recording magnetic field in a direction perpendicular to the magnetic recording medium to cause magnetization inversion and thus record information on the magnetic recording medium, the near-field optical head comprising:
   a slider configured to be arranged in a state in which a surface of the slider is disposed opposite to and confronts a surface of the magnetic recording medium, the slider having first and second inclined surfaces projecting from the surface of the slider toward the magnetic recording medium in an inclined manner with respect to an optical axis of the introduced optical flux in the state in which the surface of the slider confronts the surface of the magnetic recording medium, the first and second inclined surfaces being arranged adjacent to each other so as to share one side of the slider in common;
   a polyhedron formed on the slider so as to project toward the surface of the magnetic recording medium in the state in which the surface of the slider confronts the surface of the magnetic recording medium, the polyhedron having four side surfaces which are inclined with respect to the optical axis of the introduced optical flux, one of the four side surfaces corresponding to at least a portion of a distal end surface of the slider and two neighboring surfaces of the four side surfaces corresponding to the first inclined surface and the second inclined surface, respectively, the one surface of the polyhedron corresponding to the portion of the distal end surface of the slider corresponds to the first inclined surface, the recording element being formed on the first inclined surface of the slider;
   a plurality of convex-shaped pressure generating portions formed on the surface of the slider for generating pressure for floating the slider by making use of an air flow generated by rotation of the magnetic recording medium, each of the pressure generating portions having height substantially equal to a height of the first inclined surface and a height of the second inclined surface;
   optical flux introducing means for introducing the optical flux into the slider and toward the surface of the slider confronting the surface of the magnetic recording medium;
   a recording element formed on one of the first inclined surface and the second inclined surface of the slider, the recording element comprising a main magnetic pole and an auxiliary magnetic pole stacked one over another with an insulation film interposed therebetween;
   a metal film formed on the other of the first inclined surface and the second inclined surface of the slider the metal film allowing the introduced optical flux to propagate along an interface between the metal film and the other of the first and second inclined surfaces and thereafter generating from the introduced optical flux near-field light which extends toward the surface of the magnetic recording medium; and
   magnetic field generating means for generating a recording magnetic field between the main magnetic pole and the auxiliary magnetic pole of the recording element.

13. A near-field optical head according to claim 12; wherein the metal film is also formed on one of the surfaces of the polyhedron other than the surfaces of the polyhedron corresponding to the first and second inclined surfaces of the slider.

14. A near-field optical head for irradiating a magnetic recording medium with near-field light to effect recording and reproduction of information, the near-field optical head comprising:
   a slider having first and second inclined surfaces that project toward and confront a surface of a magnetic recording medium during recording and reproduction of information, the first and second inclined surfaces being arranged adjacent to each other so as to share one side of the slider in common;
   a polyhedron formed on the slider so as to project toward the surface of the magnetic recording medium in a state in which the first and second inclined surfaces of the slider confront the surface of the magnetic recording medium, the polyhedron having four side surfaces which are inclined with respect to the optical axis of the introduced optical flux, one of the four side surfaces corresponding to at least a portion of a distal end surface of the slider and two neighboring surfaces of the four side surfaces corresponding to the first inclined surface and the second inclined surface, respectively, the one surface of the polyhedron corresponding to the portion of the distal end surface of the slider corresponding to the first inclined surface, the recording element being formed on the first inclined surface of the slider;
   a plurality of convex-shaped pressure generating portions formed on the surface of the slider for generating pressure for floating the slider by making use of an air flow generated by rotation of the magnetic recording medium, each of the pressure generating portions having a height substantially equal to a height of the first inclined surface and a height of the second inclined surface;
   optical flux introducing means for introducing an optical flux into the slider and toward the first and second inclined surfaces, the optical flux having an optical axis inclined relative to the first and second inclined surfaces of the slider;
   a recording element formed on one of the first and second inclined surfaces of the slider, the recording element having a main magnetic pole and an auxiliary magnetic pole stacked together with an insulation film interposed therebetween;
   a metal film formed on the other of the first and second inclined surfaces of the slider for propagating the optical flux introduced by the optical flux introducing means along an interface between the first and second inclined surfaces to generate near-field light that is irradiated on the surface of the magnetic recording medium to effect recording and reproduction of information; and
   magnetic field generating means for generating a recording magnetic field between the main magnetic pole and the auxiliary magnetic pole of the recording element.

15. A near-field optical head according to claim 14; wherein the main magnetic pole is disposed directly on the one of the first and second inclined surfaces of the slider, the insulation film is disposed directly on the main magnetic pole, and the auxiliary magnetic pole is disposed directly on the insulation film.

16. A near-field optical head according to claim 14; wherein the magnetic field generating means comprises a magnetic circuit connecting together the main magnetic pole and the auxiliary magnetic pole of the recording element, and a coil formed in the insulating film of the recording element and wound around the magnetic circuit.

17. A near-field optical head according to claim 14; further comprising a polyhedron formed on the slider and containing a plurality of surfaces including the first and second inclined surfaces; and wherein in addition to being formed on the other of the first and second inclined surfaces, the metal film is formed on a surface of the polyhedron other than the one of the first and second inclined surfaces.

18. A near-field optical head according to claim 14; wherein the first inclined surface includes at least a portion of a distal end surface of the slider, the recording element being formed on the first inclined surface.

19. An information recording/reproducing device comprising:
 a near-field optical head according to claim 14;
 a beam movable in a direction parallel to a surface of the magnetic recording medium and supporting the near-field optical head on a distal end side thereof in a state where the near-field optical head is rotatable about two axes parallel to a surface of the magnetic recording medium and orthogonal to each other;
 a light source for causing the optical flux to be incident on the optical flux introducing means;
 an actuator supporting a proximal end side of the beam for moving the beam along the direction parallel to the surface of the magnetic recording medium;
 a rotation driving part for rotating the magnetic recording medium; and
 a control part for controlling an operation of the magnetic field generating means and an operation of the light source.

* * * * *